United States Patent
Sais

(10) Patent No.: US 9,782,788 B2
(45) Date of Patent: Oct. 10, 2017

(54) METHOD AND SYSTEM FOR FORMING MASKS

(71) Applicant: The Boeing Company, Chicago, IL (US)

(72) Inventor: Andrew E. Sais, Mission Viejo, CA (US)

(73) Assignee: THE BOEING COMPANY, Chicago, IL (US)

( * ) Notice: Subject to any disclaimer, the term of this patent is extended or adjusted under 35 U.S.C. 154(b) by 512 days.

(21) Appl. No.: 14/243,114

(22) Filed: Apr. 2, 2014

(65) Prior Publication Data
US 2015/0283571 A1  Oct. 8, 2015

(51) Int. Cl.

| | |
|---|---|
| *B05B 15/04* | (2006.01) |
| *B32B 37/26* | (2006.01) |
| *B26D 5/00* | (2006.01) |
| *B26D 3/08* | (2006.01) |
| *B26F 1/44* | (2006.01) |
| *B64F 5/10* | (2017.01) |

(52) U.S. Cl.
CPC ............ *B05B 15/045* (2013.01); *B26D 3/085* (2013.01); *B26D 5/005* (2013.01); *B26F 1/44* (2013.01); *B32B 37/26* (2013.01); *B64F 5/10* (2017.01); *Y10T 83/04* (2015.04); *Y10T 83/18* (2015.04)

(58) Field of Classification Search
CPC ............. B05B 15/045; B05B 15/0456; B05B 15/0475; B26D 3/08; B26D 3/085; B26D 3/10; B26D 7/01; B26D 7/015; B26D 7/018; B26F 1/18; B26F 1/22; B26F 1/3846; B26F 1/3853; B26F 1/3873; B32B 37/26; B32B 37/268; Y10T 83/882; Y10T 83/7763
See application file for complete search history.

(56) References Cited

U.S. PATENT DOCUMENTS

| | | | | |
|---|---|---|---|---|
| 4,825,555 | A * | 5/1989 | Murayama | ............. B26D 3/085 33/1 M |
| 5,508,936 | A * | 4/1996 | King | ........................ B26D 5/00 382/111 |
| 5,985,075 | A * | 11/1999 | Freedman | ............... B32B 27/08 156/229 |
| 6,619,167 | B2 * | 9/2003 | Mikkelsen | ............... B26D 5/00 347/157 |

(Continued)

*Primary Examiner* — Jason L Vaughan
*Assistant Examiner* — Amanda Meneghini
(74) *Attorney, Agent, or Firm* — Yee & Associates, P.C.

(57) ABSTRACT

A method and apparatus for protecting a structure. A surface of the structure may be identified from a model of the structure. A perimeter of the surface of the structure may be identified from the model. The perimeter may be identified for the surface of the structure to be covered by a masking system during painting of the structure. A two-dimensional representation of the masking system may be generated for the structure based on the perimeter of the surface of the structure. Features for the masking system may be generated within the two-dimensional representation. Identifiers may be assigned to the features in the two-dimensional representation. Instructions for a forming tool may be generated based on the identifiers. The masking system may be formed from a sheet of masking material using the forming tool based on the instructions.

18 Claims, 16 Drawing Sheets

(56) References Cited

U.S. PATENT DOCUMENTS

| | | | | |
|---|---|---|---|---|
| 6,797,361 B2* | 9/2004 | Bouic | ................ | B05B 15/0462 428/156 |
| 2006/0112801 A1* | 6/2006 | Ganci | ................ | B05B 15/0456 83/39 |
| 2013/0160707 A1* | 6/2013 | Moore | ................ | B05B 15/045 118/505 |

* cited by examiner

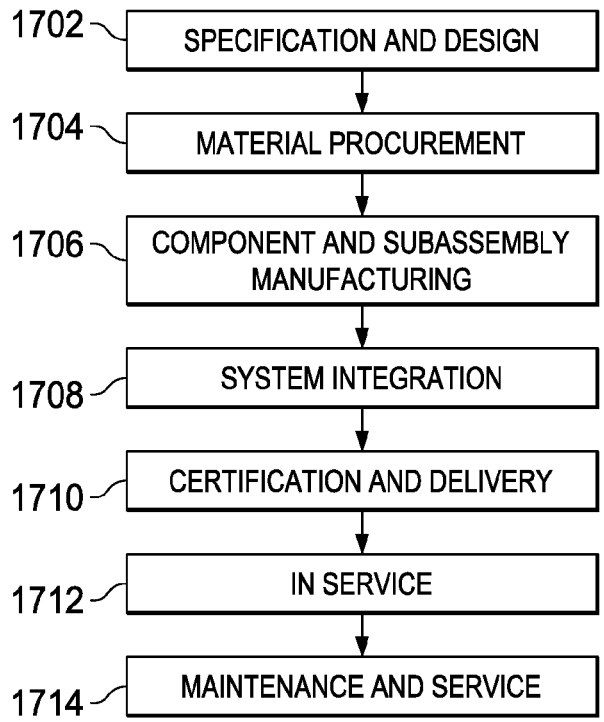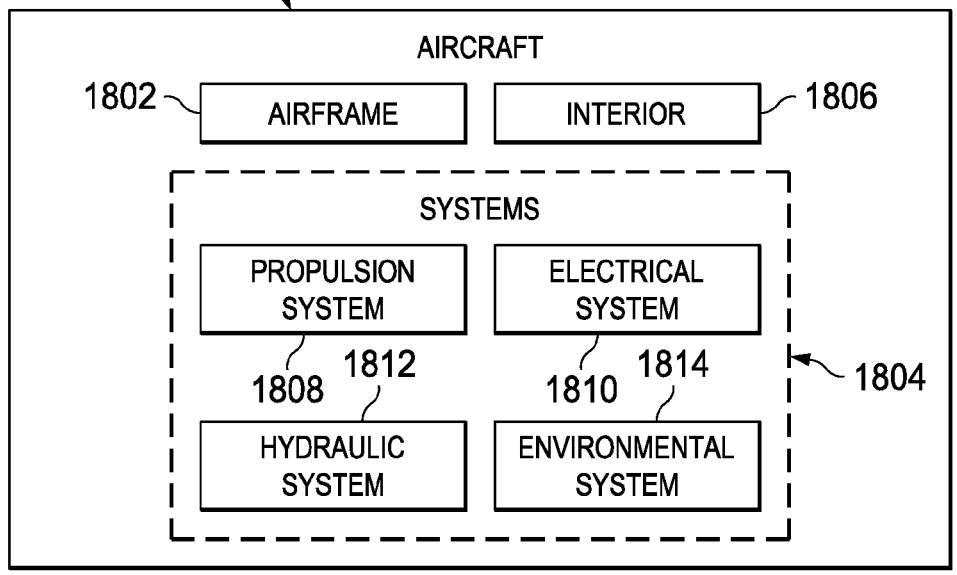

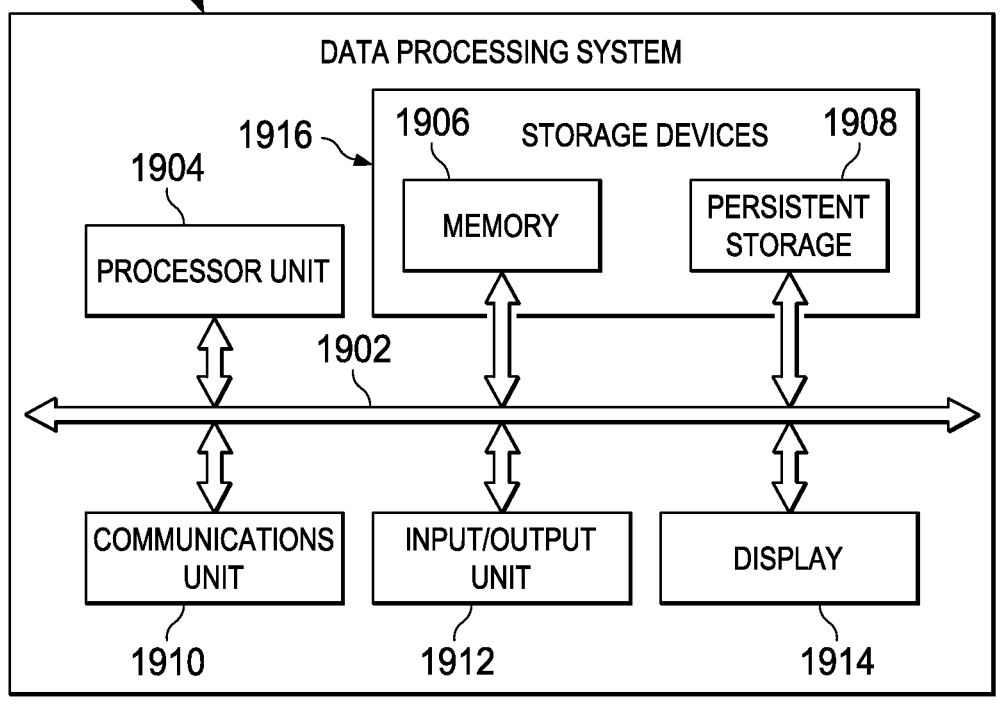
FIG. 19
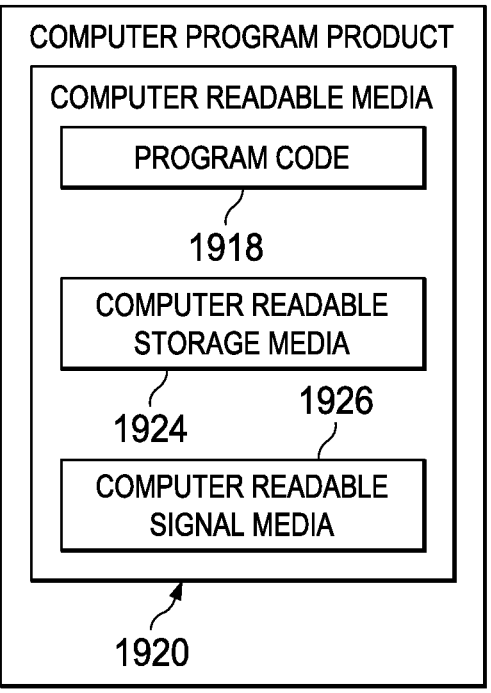

METHOD AND SYSTEM FOR FORMING MASKS

BACKGROUND INFORMATION

1. Field

The present disclosure relates generally to manufacturing aircraft and, in particular, to protecting structures while manufacturing aircraft. Still more particularly, the present disclosure relates to a method and apparatus for forming masks used to protect aircraft structures during painting.

2. Background

In manufacturing aircraft, various types of coatings may be applied to different structures on the aircraft. For example, without limitation, these coatings may be selected from at least one of a sealant, an adhesive, a primer, an optical coating, a corrosive-resistant coating, a lacquer, paint, or other suitable types of coatings.

These coatings may provide the structures with desired characteristics for the performance of the aircraft. As an example, skin panels that form the fuselage of the aircraft may be painted.

When applying paint to a structure in the aircraft, a sprayer may be used to apply the paint. Care may need to be taken such that the paint does not overspray in an undesired manner onto other structures of the aircraft.

In some cases, protective material may be placed over various structures prior to painting to protect the structures from unintended contact with the paint. This protective material may take the form of a masking material. The masking material may be secured to the surface of the structure such that movement of the masking material is reduced during painting.

The application of the masking material, however, may take more time than desired. In addition, the masking material may not protect the structure in a desired manner. As a result, the time needed to manufacture the aircraft, including rework to remove overspray, may take more time than desired. Accordingly, it is desirable to have a method and system that take into account one or more of the issues discussed above as well as possibly other issues.

SUMMARY

In one illustrative embodiment, a method for protecting a structure may be provided. A surface of the structure may be identified from a model of the structure. A perimeter of the surface of the structure may be identified from the model. The perimeter may be identified for the surface of the structure to be covered by a masking system during painting of the structure. A two-dimensional representation of the masking system may be generated for the structure based on the perimeter of the surface of the structure. Features for the masking system may be generated within the two-dimensional representation. Identifiers may be assigned to the features in the two-dimensional representation. Instructions for a forming tool may be generated based on the identifiers. The masking system may be formed from a sheet of masking material using the forming tool based on the instructions.

In another illustrative embodiment, a mask forming system may comprise a forming tool, computer-aided design software, and a controller. The forming tool may be configured to form a masking system used to protect a structure during painting. The masking system may be formed on a sheet of masking material. The computer-aided design software may be configured to retrieve a model of the structure from a database. The computer-aided design software may be further configured to identify a surface of the structure from the model of the structure. The computer-aided design software may be configured to identify a perimeter of the surface of the structure from the model. The perimeter may be identified for a surface of the structure to be covered by the masking system during painting of the structure. The computer-aided design software may be still further configured to generate a two-dimensional representation of the masking system for the structure based on the perimeter of the surface of the structure. The computer-aided design software may be further configured to reverse the two-dimensional representation. The computer-aided design software also may be configured generate features for the masking system within the two-dimensional representation. The computer-aided design software also may be configured to assign identifiers to the features in the two-dimensional representation. The controller may be configured to generate instructions for the forming tool based on the identifiers.

In yet another illustrative embodiment, a method for protecting a structure may be provided. A model of the structure may be retrieved from a database. A surface of the structure may be identified from the model of the structure. A perimeter of the surface of the structure may be identified from the model. The perimeter may be identified for the surface of the structure to be covered by a masking system during painting of the structure. The masking system may include a plurality of masks. A two-dimensional representation of the masking system may be generated for the structure based on the perimeter of the surface of the structure. A reference point corresponding to a location on a sheet of masking material may be identified. The two-dimensional representation of the masking system may be arranged with respect to the reference point such that the masking system fits within a boundary for the sheet of masking material. The plurality of masks may be arranged with respect to one another such that a desired number of masks are formed from the sheet of masking material. The two-dimensional representation of the masking system may be reversed. Features for the masking system may be generated within the two-dimensional representation. The features may include a kiss cut and a die cut. Identifiers may be assigned to the features in the two-dimensional representation. Assigning the features may comprise color-coding the features. Instructions for a forming tool may be generated based on the identifiers. The masking system may be formed using the forming tool based on the instructions. The masking system may be formed from a sheet of masking material comprising a first side and a second side. A backing material covers the second side. Forming the masking system may comprise positioning the sheet of masking material on a platform of the forming tool such that the first side of the sheet of masking material faces the platform. Forming the masking system may further comprise securing the sheet of masking material to the platform using a vacuum system prior to forming the masking system. Forming the masking system may further comprise plotting the features on the sheet of masking material. Forming the masking system may still further comprise cutting the sheet of masking material to form the masking system. Cutting the sheet of masking material may comprise cutting the sheet of masking material to a first depth corresponding with a first type of feature of the masking system. Cutting the sheet of masking material may further comprise cutting the sheet of masking material to a second depth corresponding to the perimeter of the surface of the structure. The backing material may be removed from the second side of the formed masking system to expose an adhesive. The masking system may be attached to the surface of the structure using the adhesive.

In still another illustrative embodiment, a mask forming system may comprise a forming tool, computer-aided design software, and a controller. The forming tool may be configured to form a masking system used to protect a structure during painting. The masking system may comprise a plurality of masks formed on a sheet of masking material. The sheet of masking material may comprise a first side and a second side opposite the first side and may have an adhesive and a backing material on the second side. The backing material may be configured to be removed from the second side of the masking system to expose the adhesive such that the masking system can be attached to the structure using the adhesive. The forming tool may comprise a platform, a vacuum system associated with the platform, a plotting tool, and a cutting tool. The platform may be configured to hold the sheet of masking material such that the first side of the sheet of masking material faces the platform. The vacuum system may be configured to secure the sheet of masking material to the platform prior to forming the masking system. The plotting tool may be configured to plot features on the sheet of masking material. The cutting tool may be configured to cut the sheet of masking material to form the masking system. The cutting tool may be configured to cut the sheet of masking material to a first depth corresponding with a first type of feature of the masking system and a second depth corresponding to a perimeter of a surface of the structure. The computer-aided design software may be configured to retrieve a model of the structure from a database. The computer-aided design software may be further configured to identify the surface of the structure from the model of the structure. The computer-aided design software may be further configured to identify the perimeter of the surface of the structure from the model. The perimeter may be identified for the surface of the structure to be covered by the masking system during painting of the structure. The computer-aided design software may be still further configured to generate a two-dimensional representation of the masking system based on the perimeter of the surface of the structure. The computer-aided design software may be configured to reverse the two-dimensional representation. The computer-aided design software may be further configured to generate features for the masking system within the two-dimensional representation. The features include a kiss cut and a die cut. The computer-aided design software may be further configured to assign identifiers to the features. The computer-aided design software may be still further configured to arrange the plurality of masks with respect to one another such that a desired number of masks are formed from the sheet of masking material. The controller may be configured to generate instructions for the forming tool based on the identifiers.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 17 is an illustration of a block diagram of an aircraft manufacturing and service method in accordance with an illustrative embodiment;

FIG. 18 is an illustration of a block diagram of an aircraft in which an illustrative embodiment may be implemented; and FIG. 19 is an illustration of a block diagram of a data processing system in accordance with an illustrative embodiment.

DETAILED DESCRIPTION

The illustrative embodiments recognize and take into account one or more different considerations. For example, the illustrative embodiments recognize and take into account that it may be desirable to have a protective material for protecting structures that has the shape of a surface of the structure. This protective material may take the form of a masking system. The masking system may include one or more masks. For example, without limitation, the illustrative embodiments recognize and take into account that having a masking system that has the shape of the surface of the structure may increase the level of protection from overspray of paint or other coating material during manufacturing. In this illustrative example, "overspray" refers to the application of material, such as paint, onto an unintended location.

The illustrative embodiments further recognize and take into account that it may be desirable to reduce the amount of time needed to apply the protective material to the structure. For example, without limitation, it may be desirable to form a masking system that includes an adhesive such that application onto the surface of the structure can be completed in a single step. Moreover, the illustrative embodiments recognize and take into account that it may be desirable to manufacture more than one mask in the masking system at the same time.

Thus, the illustrative embodiments may provide a method and apparatus for protecting a structure. A surface of the structure may be identified from a model of the structure. A perimeter of the surface of the structure may be identified. The perimeter may be identified for a surface of the structure to be covered by a masking system during painting of the structure. A two-dimensional representation of the masking system may be generated for the structure based on the perimeter of the surface of the structure. Features for the masking system may be generated within the two-dimensional representation. Identifiers may be assigned to the features in the two-dimensional representation. Instructions for a forming tool may be generated based on the identifiers. The masking system may be formed from a sheet of masking material using the forming tool based on the instructions.

Figure 1:
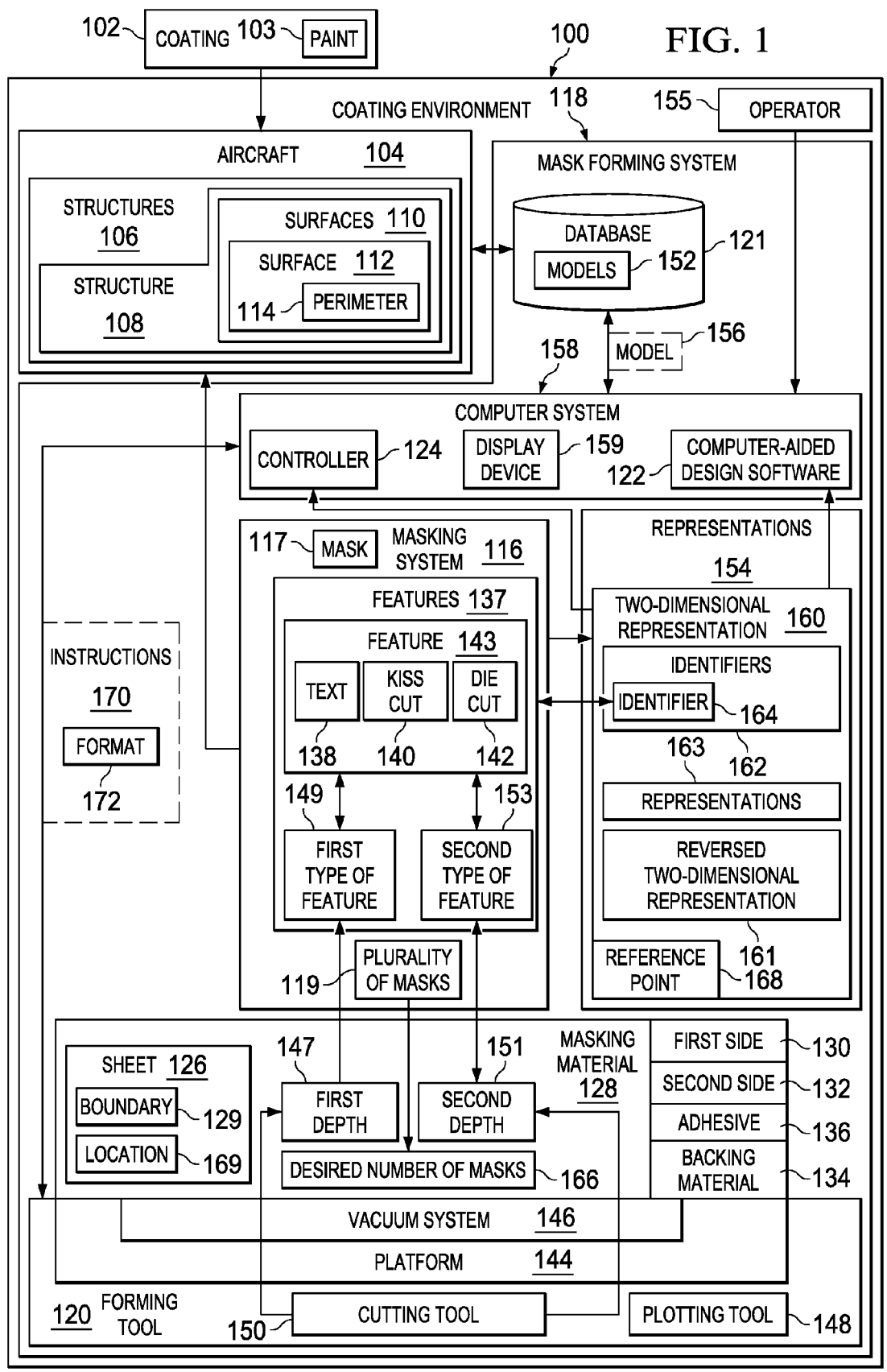
FIG. 1 is an illustration of a block diagram of a coating environment in accordance with an illustrative embodiment.

Referring now to the figures and, in particular, with reference to FIG. 1, an illustration of a block diagram of a coating environment is depicted in accordance with an illustrative embodiment. In this depicted example, coating environment 100 may be an area in which coating 102 may be applied to aircraft 104.

In this illustrative example, coating 102 may be a covering applied to aircraft 104. Coating 102 may take a number of different forms in this illustrative example. For example, without limitation, coating 102 may take the form of at least one of a sealant, an adhesive, a primer, an optical coating, a corrosive-resistant coating, a lacquer, paint, or other suitable types of coatings. In this illustrative example, coating 102 may take the form of paint 103.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As illustrated, aircraft 104 may include structures 106. Structures 106 may be physical objects that form aircraft 104. Structures 106 may take various forms in this illustrative example. For example, without limitation, one of structures 106 may take the form of a member, a skin panel, a door, a door seal, a window, a barrel, a fuselage section, a wingbox, a reservoir, a kick plate, a forward edge of a kick plate, an aft edge of a kick plate, a vent, a seal, a door vent seal, a control surface, a fastener system, a door handle, a hinge, a compartment, a static port, a light, a cargo vent, a cover plate, and other suitable types of structures.

In this illustrative example, structure 108 may be one of structures 106. Structure 108 may have surfaces 110. Surfaces 110 may be the uppermost layer of structure 108. In other words, surfaces 110 may be exposed to the environment around structure 108.

For instance, when structure 108 is a window, surfaces 110 may include one of surfaces 110 that faces outside of aircraft 104 and one of surfaces 110 that faces inside of aircraft 104. In another illustrative example, when structure 108 is a door handle, structure 108 may include more than one of surfaces 110 that face outside of aircraft 104. Surface 112 may be one of surfaces 110 of structure 108 in this illustrative example.

As depicted, surface 112 may have perimeter 114. Perimeter 114 may represent an outer boundary of surface 112. As an example, when structure 108 is a window, perimeter 114 may be the outer boundary of the window. As another example, when structure 108 is a door, perimeter 114 may be the outer boundary of the door.

It may be desirable to protect surface 112 of structure 108 as paint 103 is applied to aircraft 104. In other words, surface 112 may be a portion of aircraft 104 in which paint 103 may not be applied. Masking system 116 is a three-dimensional structure that may be used to protect surface 112 during painting of aircraft 104. Masking system 116 may be a protective coating for surface 112 in this illustrative example. Masking system 116 may include one of a single mask 117 or plurality of masks 119.

In this depicted example, masking system 116 may be used to cover surface 112 of structure 108 during the application of paint 103 to aircraft 104. Masking system 116 may be configured to reduce paint 103 from contacting surface 112 of structure 108.

As depicted, masking system 116 may be formed using mask forming system 118. Mask forming system 118 may be a device comprising forming tool 120, database 121, computer-aided design software 122, and controller 124.

Forming tool 120 may be a physical structure configured to form masking system 116 used to protect structure 108 during painting. In this illustrative example, forming tool 120 may be a Kongberg plotter manufactured by Esko-Graphics© or may be some other suitable type of forming tool, depending on the particular implementation.

As illustrated, masking system 116 may be formed on sheet 126 of masking material 128. Sheet 126 of masking material 128 may be a flat piece of masking material 128. Masking material 128 may include a material selected from one of a plastic film, paper, metal foil, cloth, and other suitable types of materials. Forming tool 120 may form masking system 116 by cutting masking material 128 using a tool such as a blade, a laser, or some other type of tool.

In this depicted example, sheet 126 of masking material 128 may have boundary 129. Sheet 126 of masking material 128 may comprise first side 130 and second side 132 opposite first side 130. Backing material 134 may cover second side 132 with adhesive 136.

In this illustrative example, first side 130 may be the side of masking material 128 that faces outward when masking system 116 is placed on surface 112 of structure 108. Second side 132 with adhesive 136 may be the side of masking material 128 that faces surface 112 of structure 108. Adhesive 136 may be a substance configured to bind masking material 128 to surface 112 of structure 108 in this illustrative example.

Adhesive 136 may be positioned between second side 132 and backing material 134 in this illustrative example. Backing material 134 may be a material selected from one of a plastic film, paper, metal foil, cloth, and other suitable types of materials.

In this depicted example, backing material 134 may be configured to be removed from second side 132 of masking system 116 to expose adhesive 136 such that masking system 116 can be attached to structure 108 using adhesive 136. As an example, backing material 134 may be peeled off of second side 132 of masking material 128 such that adhesive 136 is exposed. Thereafter, second side 132 of masking material 128 with adhesive 136 may be placed against surface 112 of structure 108 to cover surface 112 during painting.

In this illustrative example, masking system 116 formed from sheet 126 of masking material 128 may be configured to be removable. In this manner, masking system 116 may be removed from structure 108 after painting. Specifically, adhesive 136 may be separated from surface 112 of structure 108 to remove masking system 116 from structure 108.

As illustrated, masking system 116 may have features 137. Features 137 may be characteristics for masking system 116 configured to aid in attaching masking system 116 to surface 112, identifying masking system 116, designating a particular shape for masking system 116, or a combination thereof. In this illustrative example, features 137 may include kiss cut 140 and die cut 142. In other illustrative examples, features 137 may include text 138 and other suitable features. Feature 143 may be one of features 137.

In this illustrative example, text 138 may take the form of alphanumeric characters used to identify structure 108 for which masking system 116 may be used. For example, when structure 108 is a window, text 138 may indicate "window" on masking system 116. In another illustrative example, when structure 108 is a door handle, text 138 may indicate "door handle" on masking system 116.

Text 138 may be printed on backing material 134 used to form masking system 116 in this illustrative example. In still other illustrative examples, text 138 may include an identification number for structure 108.

As depicted, kiss cut 140 may be a type of cut in which only a portion of masking material 128 with backing material 134 is cut through. In this illustrative example, when performing kiss cut 140, only selective layers of material may be cut. For instance, only selective top layers of material may be cut. In this illustrative example, "top layers" may refer to the uppermost layers of a material that face the means of performing kiss cut 140. One or more layers of material may remain intact.

For instance, when making kiss cut 140, only one layer of material may be cut through. In this illustrative example, only backing material 134 may be cut through during kiss cut 140. In this example, the cutting means stops its cut before reaching second side 132 of masking material 128 with adhesive 136. In this manner, first side 130 and second side 132 with adhesive 136 of masking material 128 remain intact. With kiss cut 140, backing material 134 may be peeled off easily to expose adhesive 136.

In this illustrative example, die cut 142 may be a type of cut in which masking material 128 is cut all the way through. In other words, all of the layers of masking material 128 with backing material 134 may be cut through. In some cases, die cut 142 may be referred to as a "thru cut." In this manner, die cut 142 may separate masking system 116 from the rest of sheet 126 of masking material 128.

For example, when making die cut 142, all layers of masking material 128 may be cut through to separate masking system 116 from sheet 126 of masking material 128. Specifically, first side 130, second side 132, and adhesive 136 may be cut through. Backing material 134 covering second side 132 is also cut through. After die cut 142 is made to form masking system 116, masking system 116 may be used to protect surface 112 of structure 108 by peeling off backing material 134 and securing masking system 116 on surface 112.

As illustrated, forming tool 120 may comprise platform 144, vacuum system 146, plotting tool 148, and cutting tool 150. Platform 144 may be a structure configured to hold sheet 126 of masking material 128 such that first side 130 of sheet 126 of masking material 128 faces platform 144. In this manner, sheet 126 of masking material 128 may be "face down" on platform 144.

In this illustrative example, vacuum system 146 may be physically associated with platform 144. For example, a first component, such as vacuum system 146, may be considered to be physically associated with a second component, such as platform 144, by being secured to the second component, bonded to the second component, mounted to the second component, welded to the second component, fastened to the second component, connected to the second component in some other suitable manner, or a combination thereof. The first component also may be connected to the second component using a third component.

Further, the first component may be considered to be associated with the second component by being formed as part of the second component, as an extension of the second component, or a combination thereof. In this depicted example, vacuum system 146 may be a device configured to secure sheet 126 of masking material 128 to platform 144 prior to forming masking system 116.

As depicted, plotting tool 148 may be a device configured to plot features 137 on sheet 126 of masking material 128. Specifically, plotting tool 148 may be configured to mark backing material 134 in a desired manner. For instance, plotting tool 148 may plot text 138 on backing material 134 covering sheet 126 of masking material 128. Plotting tool 148 may be oriented above platform 144 in this illustrative example.

In this depicted example, cutting tool 150 is a device configured to cut sheet 126 of masking material 128 to form masking system 116. For example, without limitation, cutting tool 150 may form kiss cut 140 and die cut 142 in sheet 126 of masking material 128 to form masking system 116. Cutting tool 150 may be associated with plotting tool 148 and also may be oriented above platform 144 in this illustrative example.

As illustrated, cutting tool 150 may be configured to cut sheet 126 of masking material 128 to first depth 147 corresponding with first type of feature 149 of masking system 116. As an example, kiss cut 140 may be first type of feature 149. First depth 147 may correspond to the depth desired for kiss cut 140.

In a similar fashion, cutting tool 150 may be configured to cut sheet 126 of masking material 128 to second depth 151 corresponding to second type of feature 153 of masking system 116. For instance, second type of feature 153 may be die cut 142 corresponding to perimeter 114 of masking system 116.

As depicted, forming tool 120 may be used to form masking system 116 based on models 152 of structures 106 stored in database 121. In this illustrative example, database 121 may be a storage device configured to store models 152.

Models 152 may be data files used to generate representations 154 of structures 106 in aircraft 104. Each of models 152 may correspond to one of structures 106. Model 156 may correspond to structure 108 in this illustrative example.

Representations 154 may be views of structure 108 based on various inputs. For instance, representations 154 may be generated based on input from operator 155, model 156, input from another source, or other suitable inputs. Operator 155 may be a human operator in this illustrative example.

Representations 154 may take the form of a three-dimensional representation, a two-dimensional representation, or some other type of representation. Representations 154 may be modified, analyzed, or both using computer-aided design software 122.

In this depicted example, computer-aided design software 122 may be a computer program implemented within computer system 158. In this illustrative example, computer system 158 may include one or more computers. When more than one computer is present in computer system 158, those computers are in communication with each other via a communications medium such as a network.

Computer system 158 may include display device 159 in this illustrative example. Display device 159 may be hardware configured to present representations 154 of structures 106 to operator 155. Display device 159 may be selected from at least one of a touch screen, a computer monitor, a mobile device, a laptop, an electronic reader, a projector, or some other type of display device.

As illustrated, computer-aided design software 122 may be selected from various types of software. For example without limitation, computer-aided design software 122 may be selected from at least one of AutoCAD, Autodesk, CATIA, Pro/Engineer, SolidWorks, Unigraphics, or other suitable types of computer-aided design software.

In this depicted example, computer-aided design software 122 may be configured to retrieve model 156 of structure 108 from database 121. From model 156, computer-aided design software 122 may then identify surface 112 and perimeter 114 of surface 112 of structure 108 to be covered by masking system 116.

As illustrated, once perimeter 114 of surface 112 of structure 108 that is to be covered by masking system 116 is identified, computer-aided design software 122 may generate two-dimensional representation 160 of masking system 116 based on perimeter 114 of surface 112. Two-dimensional representation 160 may be a planar projection of surface 112 of structure 108, which corresponds to a final three-dimensional structure for masking system 116.

In this illustrative example, computer-aided design software 122 may be configured to reverse two-dimensional representation 160, resulting in reversed two-dimensional representation 161. In other words, computer-aided design software 122 may flip two-dimensional representation 160 on the vertical axis to form reversed two-dimensional representation 161. Reversed two-dimensional representation 161 is formed such that features 137 are identified on the correct side of sheet 126 of masking material 128. In this illustrative example, reversed two-dimensional representation 161 may show what masking system 116 will look like when formed by forming tool 120.

In this depicted example, features 137 may be outlined in two-dimensional representation 160. In other words, features 137 for the three-dimensional masking system 116 are drawn in two-dimensional representation 160 of masking system 116.

Features 137 for masking system 116 then may be assigned identifiers 162 in two-dimensional representation 160. Each of features 137 may be assigned to the same or a different one of identifiers 162 in two-dimensional representation 160.

Identifiers 162 take various forms in this illustrative example. For example, without limitation, one of identifiers 162 may be selected from one of a layer of a representation, a numerical value, a data set, a color, a type of shading, a line, and other types of identifiers.

Identifiers 162 may be used to distinguish one of features 137 from another one of features 137. For instance, when identifiers 162 are color-coded identifiers, each of features 137 may be assigned to a different color. For example, without limitation, die cut 142 may be color-coded green, text 138 may be color-coded yellow, and kiss cut 140 may be color-coded cyan. Color-coding of features 137 in two-dimensional representation 160 of masking system 116 may aid in modifying, orienting, or both modifying and orienting features 137.

Identifiers 162 then may be used to generate instructions 170 for forming tool 120. In this depicted example, identifier 164 may be one of identifiers 162. Feature 143 may be assigned identifier 164 and instructions 170 for feature 143 may be generated based on identifiers 162.

When masking system 116 comprises plurality of masks 119, computer-aided design software 122 may be configured to arrange representations 163 of structures 106 corresponding to plurality of masks 119 with respect to one another such that desired number of masks 166 is formed from sheet 126 of masking material 128. For example, without limitation, computer-aided design software 122 may arrange representations 163 of plurality of masks 119 next to one another in two-dimensional representation 160 of masking system 116 by limiting spacing between the representations 163, orienting the representations 163 in various ways, or a combination thereof. Representations 163 may be arranged within two-dimensional representation 160 of masking system 116.

Computer-aided design software 122 may arrange representations 163 for plurality of masks 119 by identifying reference point 168 corresponding to location 169 on sheet 126 of masking material 128. Location 169 may be a physical location on masking material 128.

For example, without limitation, location 169 may be a corner of sheet 126 of masking material 128. Based on reference point 168, two-dimensional representation 160 of masking system 116 may be positioned with respect to reference point 168 such that masking system 116 fits within boundary 129 for sheet 126 of masking material 128.

As illustrated, controller 124 may be a device configured to generate instructions 170 for forming tool 120 based on identifiers 162 such that forming tool 120 forms masking system 116 with features 137 in a desired manner. In this illustrative example, controller 124 may be implemented in software, hardware, firmware, or a combination thereof. When software is used, the operations performed by controller 124 may be implemented using, for example, without limitation, program code configured to run on a processor unit. When firmware is used, the operations performed by controller 124 may be implemented using, for example, without limitation, program code and data and stored in persistent memory to run on a processor unit.

When hardware is employed, the hardware may include one or more circuits that operate to perform the operations performed by controller 124. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations, processes or both performed by controller 124 may be performed using organic components integrated with inorganic components. In some cases, the operations, processes, or both may be performed by entirely of organic components, excluding a human being. As one illustrative example, circuits in organic semiconductors may be used to perform these operations, processes, or both. In this illustrative example, controller 124 may be implemented in computer system 158. In other illustrative examples, controller 124 may be remote to computer system 158.

As depicted, instructions 170 may be commands executable by forming tool 120. For example, without limitation, instructions 170 may be commands for at least one of plotting tool 148 or cutting tool 150.

Controller 124 may generate instructions 170 in format 172 usable for forming tool 120. Instructions 170 may then be sent to forming tool 120 in format 172 such that forming tool 120 may form masking system 116 with features 137 from sheet 126 of masking material 128. Instructions 170 may be sent to forming tool 120 via wireless communications links, wired communications links, another suitable type of communications medium, or a combination thereof.

The illustration of mask forming system 118 and the components within mask forming system 118 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

As an example, although vacuum system 146 may be used to secure sheet 126 of masking material 128 to platform 144 during formation of masking system 116, other types of structures may be used. For instance, a number of clips, fasteners, tapes, clamps, or other suitable structures may be used to secure sheet 126 of masking material 128.

In still other illustrative examples, more than one of cutting tool 150, plotting tool 148, or both may be present in forming tool 120. Further, features 137 may be cut into masking material 128 to a third depth, a fourth depth, or any number of depths. For instance, a first one of kiss cut 140 may be cut to first depth 147, die cut 142 may be cut to second depth 151, and a second one of kiss cut 140 may be cut to a third depth.

In yet another illustrative example, database 121 may be part of a product lifecycle management system including product lifecycle management software such as, for example, without limitation, ENOVIA. In this manner, database 121 may include a number of storage devices that store portions of models 152. These databases may be accessed using the lifecycle management software.

Figure 2:
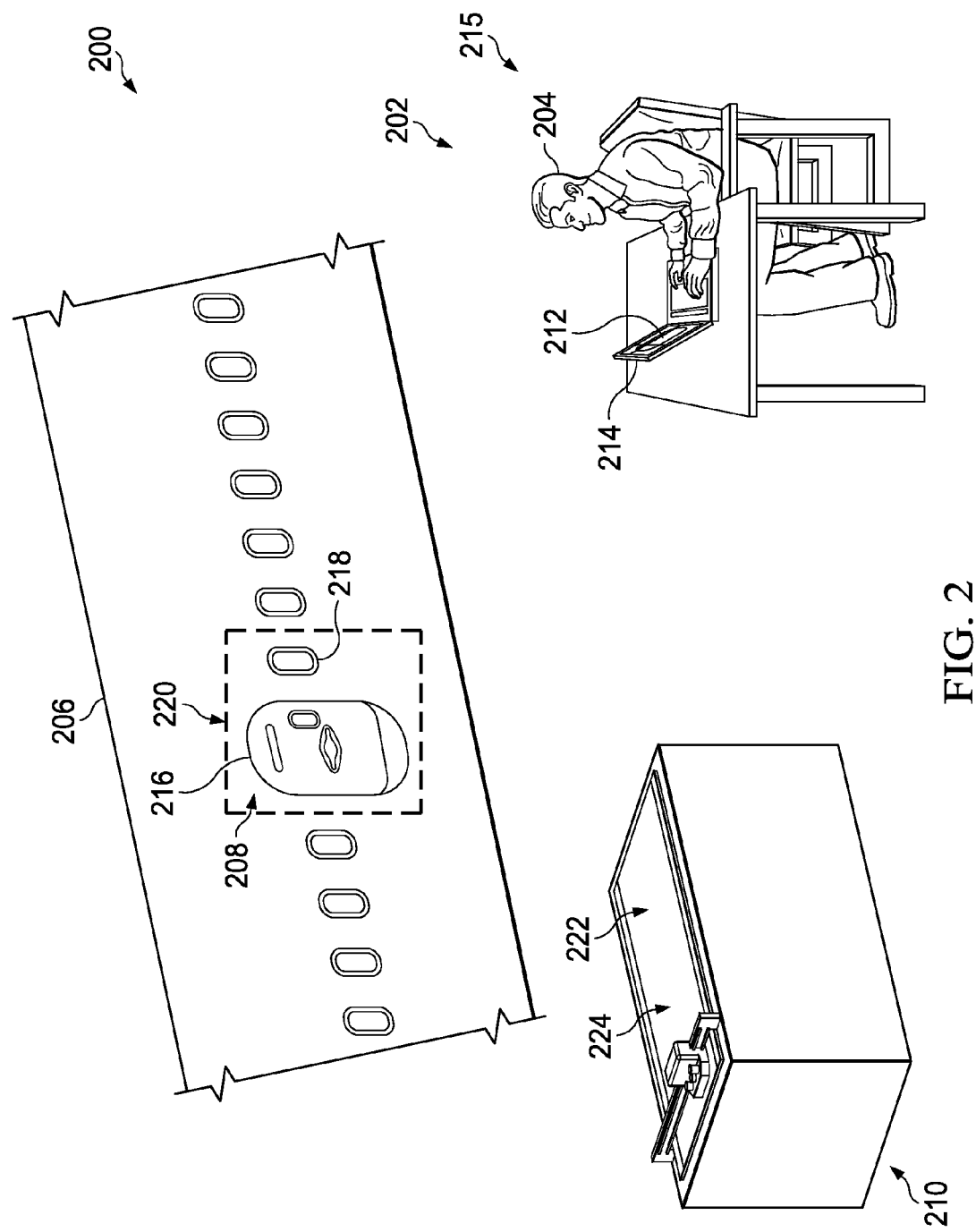
FIG. 2 is an illustration of a coating environment in accordance with an illustrative embodiment.

With reference now to FIG. 2, an illustration of a coating environment is depicted in accordance with an illustrative embodiment. In this depicted example, coating environment 200 may be an example of an implementation for coating environment 100 shown in block form in FIG. 1.

As depicted, coating environment 200 may include mask forming system 202, operator 204, and aircraft 206 with structures 208. In this illustrative example, mask forming system 202, operator 204, and aircraft 206 with structures 208 may be examples of implementations for mask forming system 118, operator 155, and aircraft 104 with structures 106, respectively, in FIG. 1.

In this depicted example, mask forming system 202 may be used to form masks (not shown) for structures 208 in aircraft 206. Mask forming system 202 may include forming tool 210, computer-aided design software 212, and controller 214. Both computer-aided design software 212 and controller 214 may be implemented in computer system 215 in this illustrative example. Forming tool 210, computer-aided design software 212, controller 214, and computer system 215 may be examples of implementations for forming tool 120, computer-aided design software 122, controller 124, and computer system 158, respectively, shown in block form in FIG. 1.

In this illustrative example, door 216 and window 218 may be structures 208 in aircraft 206. Door 216 and window 218 are shown in section 220 of aircraft 206 in this illustrative example.

A plurality of masks (not shown in this view) may be formed from sheet 222 of masking material 224 for door 216 and window 218. Sheet 222 of masking material 224 may be an example of an implementation for sheet 126 of masking material 128 shown in block form in FIG. 1.

Figure 3:
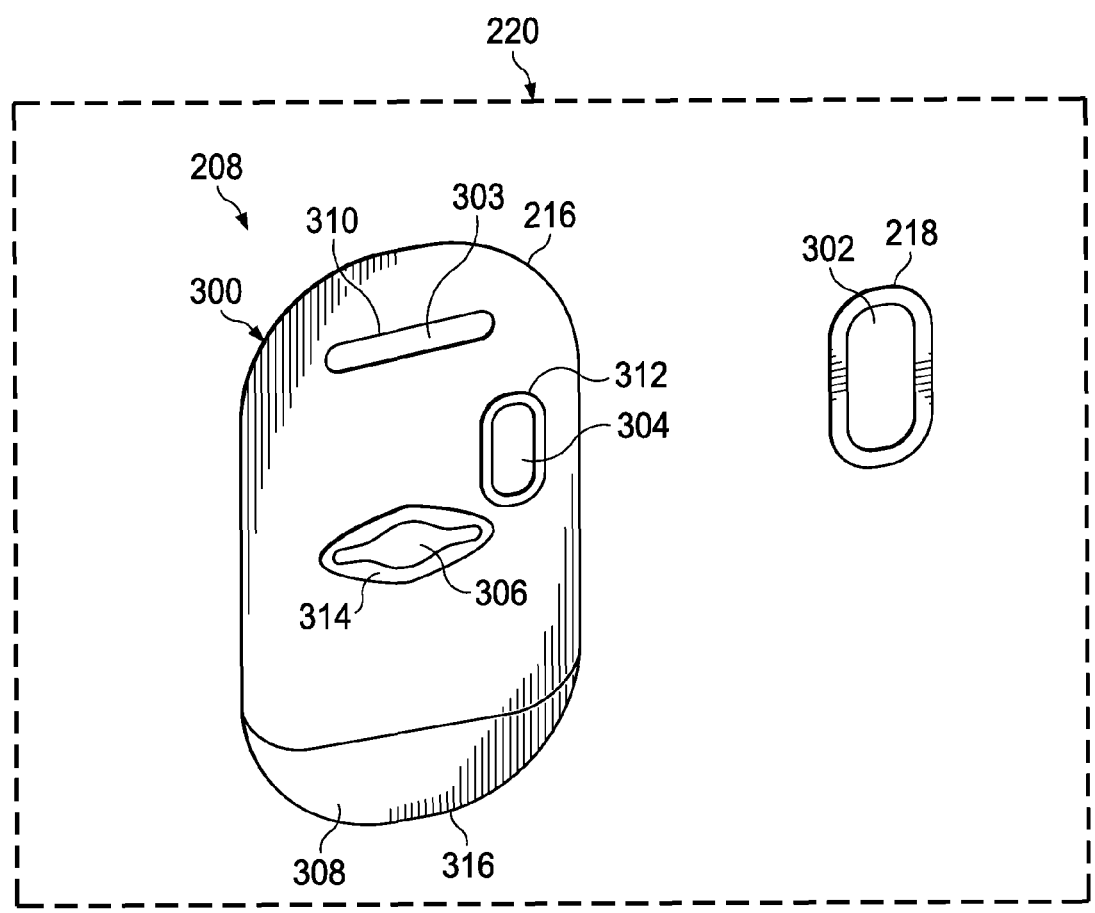
FIG. 3 is an illustration of a section of an aircraft with a door and a window in accordance with an illustrative embodiment.

Turning next to FIG. 3, an illustration of section 220 of aircraft 206 with door 216 and window 218 from FIG. 2 is depicted in accordance with an illustrative embodiment. In this view, components within door 216 and window 218 are shown in greater detail.

As depicted, door 216 may include surfaces 300 and window 218 may include surface 302. Surfaces 300 and surface 302 may be examples of implementations for surfaces 110 and surface 112, respectively, shown in block form in FIG. 1.

In this illustrative example, surfaces 300 for door 216 may comprise surface 303, surface 304, surface 306, and surface 308. Surface 303 may correspond to pressure relief vent 310, surface 304 may correspond to viewing window 312, surface 306 may correspond to door handle 314, and surface 308 may correspond to kick plate 316 of door 216.

It may not be desirable to paint surfaces 300 of door 216 and surface 302 of window 218 when painting aircraft 206. As a result, surfaces 300 of door 216 and surface 302 of window 218 may need to be protected from contact with paint (not shown) during painting of aircraft 206. Masks (not shown) may be formed for each of surfaces 300 and surface 302 using the components within mask forming system 202 in FIG. 2. Operator 204 may form and apply these masks to surfaces 300 of door 216 and surface 302 of window 218, as well as other surfaces on structures 208 of aircraft 206 shown in FIG. 2.

Figure 4:
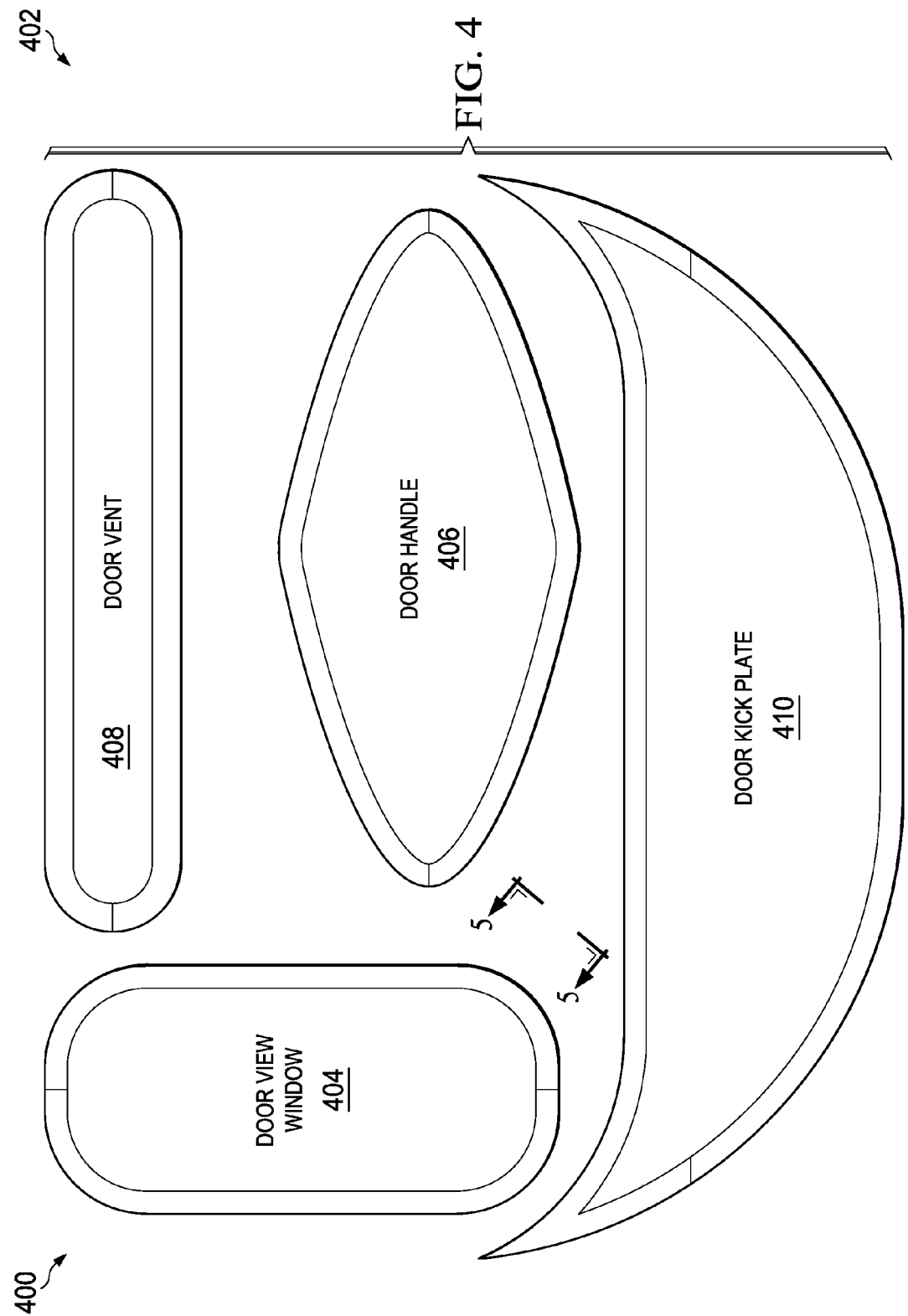
FIG. 4 is an illustration of a top view of a plurality of masks for surfaces in accordance with an illustrative embodiment.

Referring next to FIG. 4, an illustration of a top view of a plurality of masks for surfaces 300 from FIG. 3 is depicted in accordance with an illustrative embodiment. In this depicted example, plurality of masks 400 in masking system 402 may have been formed for surfaces 300 of door 216 in FIG. 3. Plurality of masks 400 in masking system 402 may be an example of implementations for plurality of masks 400 in masking system 116 shown in block form in FIG. 1.

As depicted, plurality of masks 400 may be used to cover surfaces 300 during painting of aircraft 206 in FIG. 2. In this illustrative example, mask 404 may correspond to surface 304 of viewing window 312, mask 406 may correspond to surface 306 of door handle 314, mask 408 may correspond to surface 303 of pressure relief vent 310, and mask 410 may correspond to surface 308 of kick plate 316 of door 216 in FIG. 3.

In some cases, mask 410 may be separated into one or more masks for kick plate 316. For instance, a mask for the forward edge of kick plate 316 and a mask for the aft edge of kick plate 316 may be formed. In this case, only the forward edge and the aft edge of kick plate 316 may be covered with masks during painting. As a result, only those portions of surface 308 may be covered, leaving some of surface 308 exposed.

Other masks for other structures 208 may be formed in masking system 402 in addition to plurality of masks 400. Those masks are not shown in this view.

Figure 5:
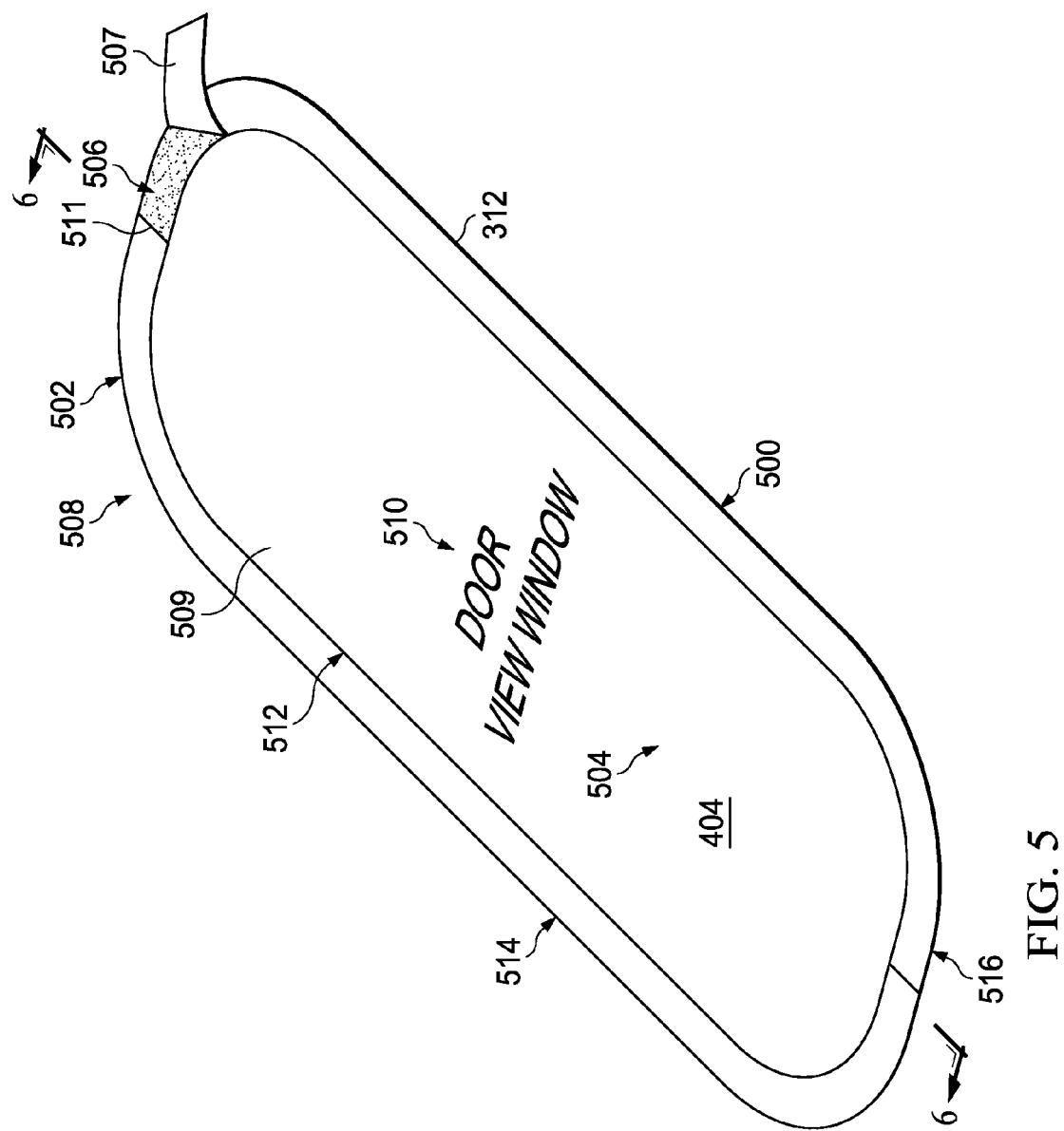
FIG. 5 is an illustration of a perspective view of a mask in accordance with an illustrative embodiment.

In FIG. 5, an illustration of a perspective view of mask 404 shown in the direction of lines 5-5 in FIG. 4 is depicted in accordance with an illustrative embodiment. Mask 404 may be formed from masking material 224 in FIG. 2 having first side 500 and second side 502. Backing material 504 covers second side 502 of masking material 128. Masking material 224 also may include adhesive 506 located between second side 502 and backing material 504.

First side 500, second side 502, backing material 504, and adhesive 506 may be examples of implementations for first side 130, second side 132, backing material 134, and adhesive 136 shown in block form in FIG. 1. Backing material 504 may be removed to expose adhesive 506 in this illustrative example.

In particular, portion 507 and portion 509 of backing material 504 may be removed to expose adhesive 506. After backing material 504 is removed, mask 404 may be placed over surface 304 of viewing window 312 of door 216 to protect surface 304 in FIG. 3 during painting.

As illustrated, mask 404 may have features 508. Features 508 may include text 510, kiss cut 512, and die cut 514. Die cut 514 may be formed along perimeter 516 corresponding to a perimeter of surface 304 of viewing window 312. Features 508, text 510, kiss cut 512, die cut 514, and perimeter 516 may be examples of implementations for features 137, text 138, kiss cut 140, die cut 142, and perimeter 114 in FIG. 1.

In this illustrative example, text 510 may indicate that mask 404 may be used for viewing window 312 in door 216. Kiss cut 512 may provide a way for operator 204 to easily remove backing material 504 to expose adhesive 506.

As an example, kiss cut 512 may provide a way to "crack and peel" backing material 504 to expose adhesive 506. For instance, mask 404 may be bent (not shown) at any point along kiss cut 512 to peel off backing material 504.

In this illustrative example, portion 507 of backing material 504 is removed by bending mask 404 (not shown) at slit 511. After bending, portion 507 of backing material 504 may be separated from mask 404. Portion 507 of backing material 504 may be peeled off completely or partially, while portion 509 remains. After portion 507 is peeled off, an operator may continue to peel off portion 509 of backing material 504 to expose all of adhesive 506.

As illustrated, die cut 514 with perimeter 516 corresponding to a perimeter of surface 304 may allow mask 404 to cover substantially all of surface 304 of viewing window 312. In this manner, features 508 may provide identification, ease of application, and protection for surface 304. Each of features 508 may be identified by computer-aided design software 212 and formed using forming tool 210 in FIG. 2.

Figure 6:
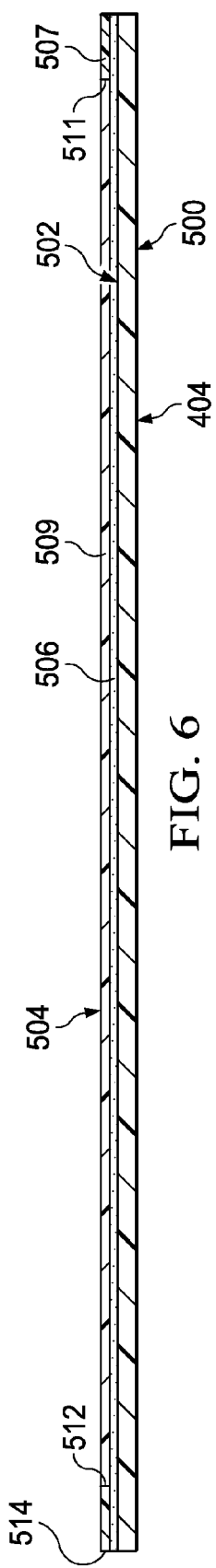
FIG. 6 is an illustration of a cross-sectional view of a mask in accordance with an illustrative embodiment.

With reference now to FIG. 6, an illustration of a cross-sectional view of mask 404 taken along lines 6-6 in FIG. 5 is depicted in accordance with an illustrative embodiment. In this depicted example, kiss cut 512 may form portion 507 and portion 509 of backing material 504.

As shown, kiss cut 512 may not go through adhesive 506, second side 502, or first side 500 of mask 404. Die cut 514 around perimeter 516 may be a cut through all layers of mask 404 in this illustrative example.

Figure 7:
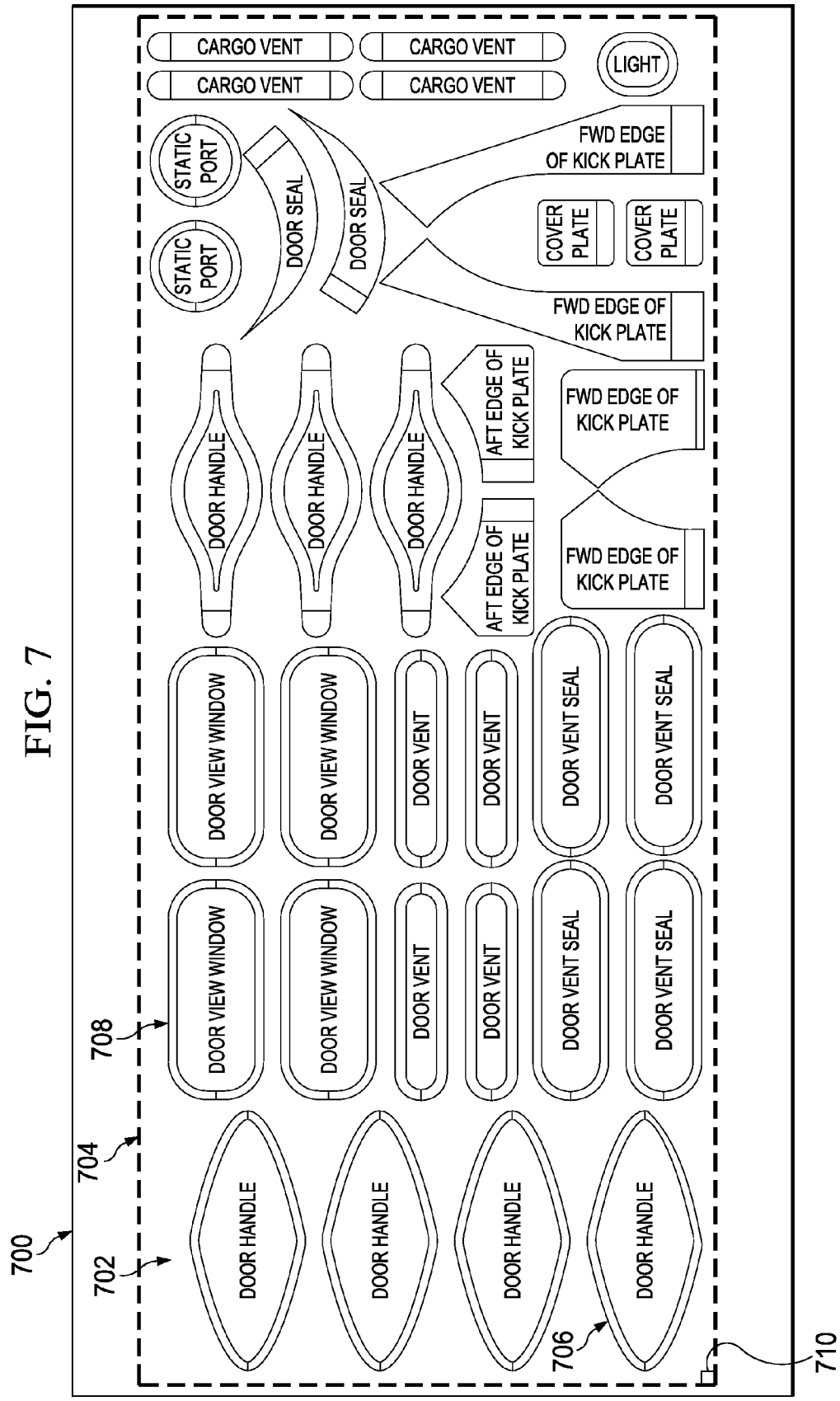
FIG. 7 is an illustration of a computer system with a two-dimensional representation of a masking system in accordance with an illustrative embodiment.

In FIG. 7, an illustration of computer system 215 from FIG. 2 with a two-dimensional representation of masking system 402 from FIG. 4 is depicted in accordance with an illustrative embodiment. In this depicted example, display device 700 may show two-dimensional representation 702 of masking system 402. In other words, two-dimensional representation 702 is a two-dimensional representation of a final three-dimensional masking system.

Display device 700 and two-dimensional representation 702 may be examples of implementations for display device 159 and two-dimensional representation 160 of masking system 116 shown in block form in FIG. 1. In this case, two-dimensional representation 702 is a reversed representation such that masking system may be formed with the desired configuration with features 508 formed on the backing material side of the sheet of masking material.

In this depicted example, two-dimensional representation 702 may include representations 704 of plurality of masks 400 in masking system 402 in FIG. 4. Representations 704 may be an example of an implementation for representations 154 of plurality of masks 119 shown in FIG. 1.

Computer-aided design software 212 may be used to generate two-dimensional representation 702 of masking system 402. Representations 704 of plurality of masks 400 may be arranged with respect to one another in two-dimensional representation 702 such that a desired number of masks may be formed on sheet 222 of masking material 224 in FIG. 2.

In this illustrative example, each of representations 704 of the plurality of masks may correspond to surfaces on structures 208 of aircraft 206 shown in FIG. 2. For example, without limitation, representations 704 of the plurality of masks may correspond to surfaces 300 of door 216 in FIG. 3. As an example, representation 706 may correspond to surface 306 of door handle 314, while representation 708 may correspond to surface 304 of viewing window 312 of door 216 in FIG. 3.

In this depicted example, reference point 710 may be identified in two-dimensional representation 702. Representations 704 of plurality of masks 400 may be arranged with respect to reference point 710. Reference point 710 may be an example of an implementation for reference point 168 corresponding to boundary 129 of sheet 126 of masking material 128 shown in block form in FIG. 1.

Figure 8:
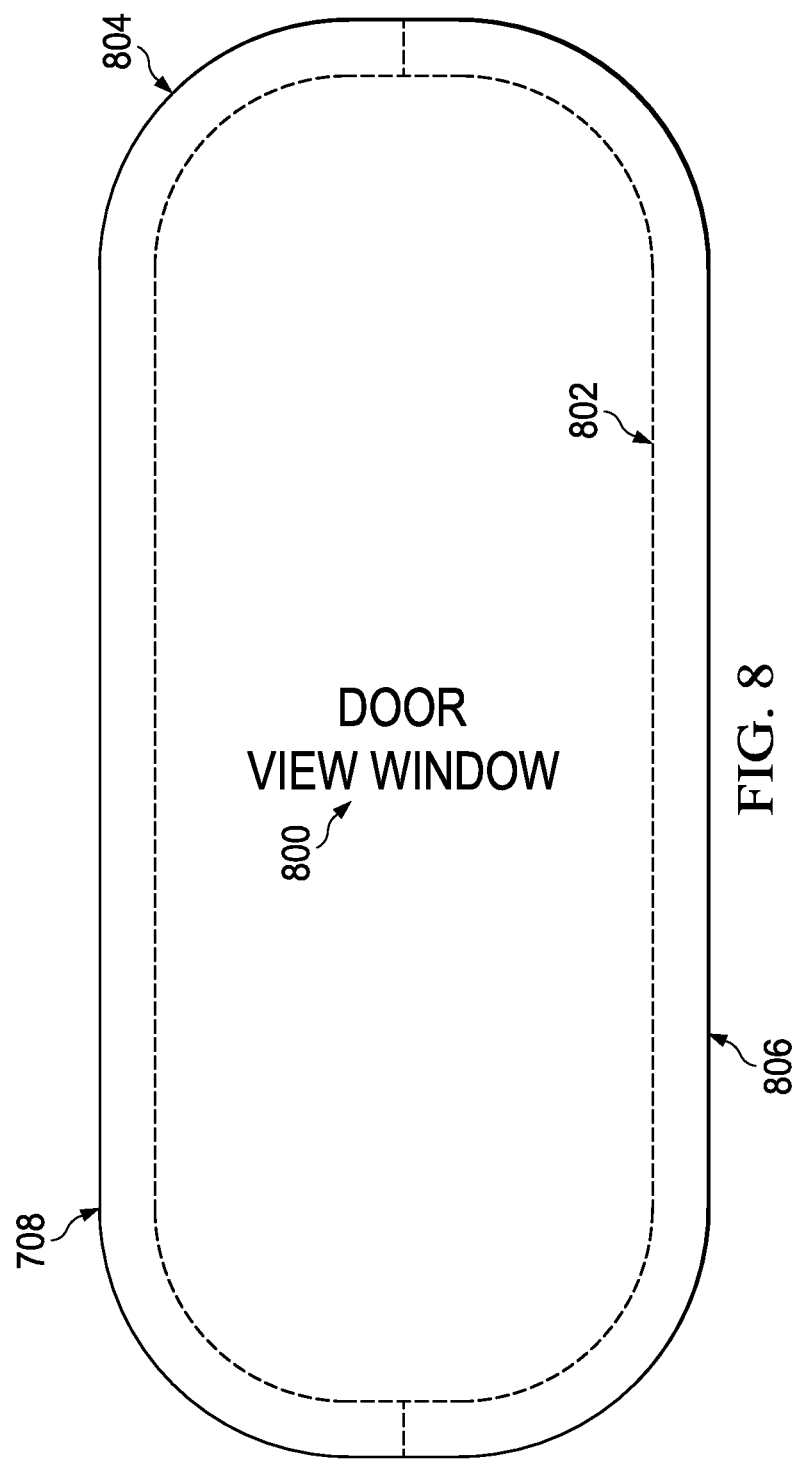
FIG. 8 is an illustration of a representation of a mask for a surface of a viewing window in accordance with an illustrative embodiment.

Turning now to FIG. 8, an illustration of representation 708 of mask 404 for surface 304 of viewing window 312 from FIG. 4 is depicted in accordance with an illustrative embodiment. In this depicted example, components within representation 708 are shown in greater detail.

As depicted, representation 708 may include text 800, cut line 802, and cut line 804. In this illustrative example, text 800 may correspond to text 510, cut line 802 may correspond to kiss cut 512, and cut line 804 may correspond to die cut 514 for mask 404 in FIG. 5.

Cut line 802 may be a desired location for a forming tool to make kiss cut 512 in mask 404. Cut line 804 may be a desired location for the forming tool to make die cut 514 to separate mask 404 from the sheet of masking material. In other words, kiss cut 512 for mask 404 is outlined in representation 708 by cut line 802 and die cut 514 for mask 404 is outlined in representation 708 by cut line 804. In this manner, text 800, cut line 802, and cut line 804 in representation 708 of mask 404 may represent features 508 in mask 404, the final three-dimensional structure, shown in FIG. 5.

Each of text 800, cut line 802, and cut line 804 may be assigned one of identifiers 806 in representation 708. Identifiers 806 may be an example of an implementation of identifiers 162 shown in block form in FIG. 1. Identifiers 806 may be differentiated by color, or in some other manner, in this illustrative example.

For instance, text 800 may be color-coded cyan. Cut line 802 may be color-coded green. Cut line 804 may be color-coded white.

The color-coding of text 800, cut line 802, and cut line 804 may allow controller 214 to generate instructions (not shown) for forming tool 210 in FIG. 2 based on identifiers 806 for features 508 of mask 404. For example, forming tool 210 may use the color-coding to determine which type of cut to make in the masking material.

Figure 10:
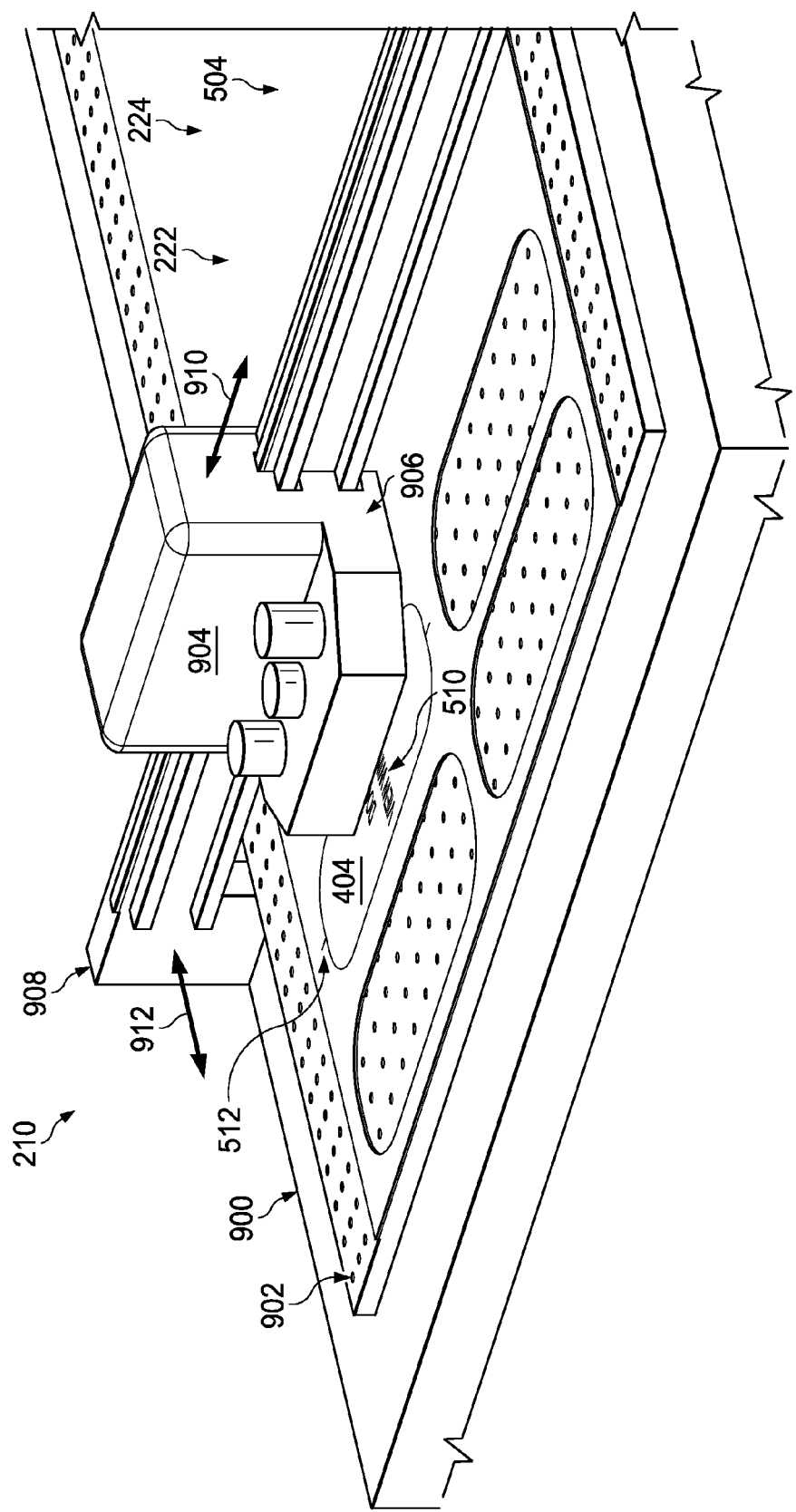
FIG. 10 is an illustration of a forming tool forming a mask with features in accordance with an illustrative embodiment.

In some cases, these instructions may include commands to form more than one of mask 404 as shown in FIG. 10. In other words, the instructions may include commands to duplicate the production of mask 404 one or more times.

Figure 9:
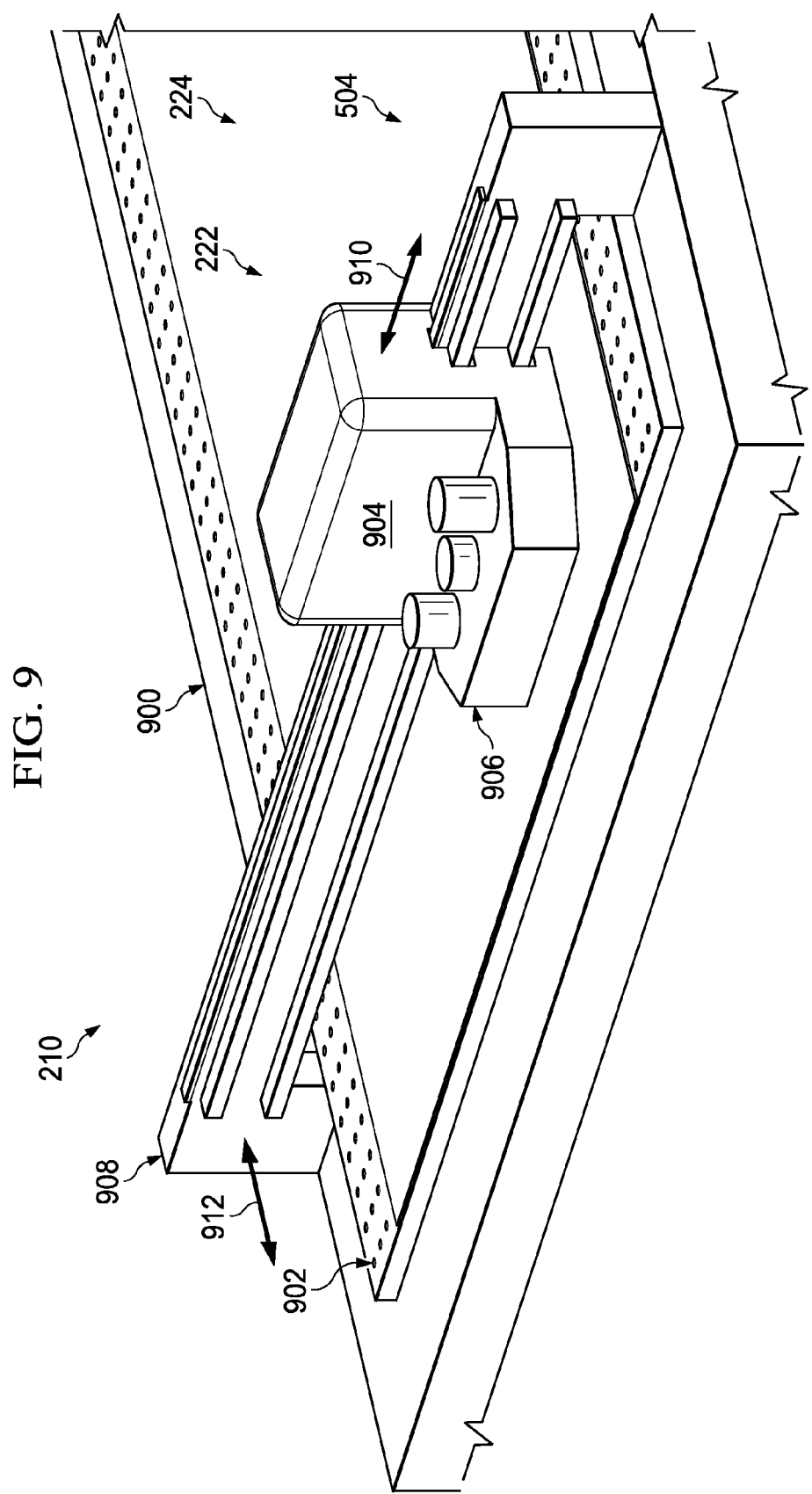
FIG. 9 is a more detailed illustration of a forming tool in accordance with an illustrative embodiment.

With reference next to FIG. 9, a more detailed illustration of forming tool 210 from FIG. 2 is depicted in accordance with an illustrative embodiment. In this depicted example, forming tool 210 may receive the instructions from controller 214 in FIG. 2 to form masking system 402 shown in FIG. 4 from sheet 222 of masking material 224.

As depicted, forming tool 210 may include platform 900, vacuum system 902, plotting tool 904, and cutting tool 906. Platform 900, vacuum system 902, plotting tool 904, and cutting tool 906 may be examples of implementations for platform 144, vacuum system 146, plotting tool 148, and cutting tool 150 shown in block form in FIG. 1.

In this illustrative example, sheet 222 of masking material 224 may be positioned on platform 900 with backing material 504 facing upward. Plotting tool 904 and cutting tool 906 may be positioned over sheet 222 of masking material 224. Plotting tool 904 and cutting tool 906 may move back and forth along support 908 in the direction of arrow 910 as masking system 402 is being formed.

Plotting tool 904 and cutting tool 906 also may be moved as support 908 moves back and forth in the direction of arrow 912. At least one of plotting tool 904 and cutting tool 906 may rotate or move in various other directions, depending on the particular implementation. In this manner, plurality of masks 400 in FIG. 4 with different shapes may be formed from sheet 222 of masking material 224.

In FIG. 10, an illustration of forming tool 210 from FIG. 9 forming mask 404 with features 508 from FIG. 5 is depicted in accordance with an illustrative embodiment. In this depicted example, forming tool 210 may be instructed to form four of mask 404 in sheet 222 of masking material 224.

As depicted, three duplicates of mask 404 have been formed. These three masks are not shown in this view and have been removed from sheet 222 of masking material 224. In this illustrative example, forming tool 210 may be forming the fourth mask 404.

As illustrated, plotting tool 904 has formed text 510 of mask 404 based on text 800 in representation 708 of mask 404 from FIG. 8. Also, cutting tool 906 has formed kiss cut 512 of mask 404 based on cut line 802 in representation 708 of mask 404 in FIG. 8.

In this illustrative example, kiss cut 512 may not extend through masking material 224. Die cut 514 has not yet been formed to separate mask 404 from sheet 222 of masking material 224 in this illustrative example. Each of plurality of masks 400 in masking system 402 may be formed in this manner.

Figure 11:
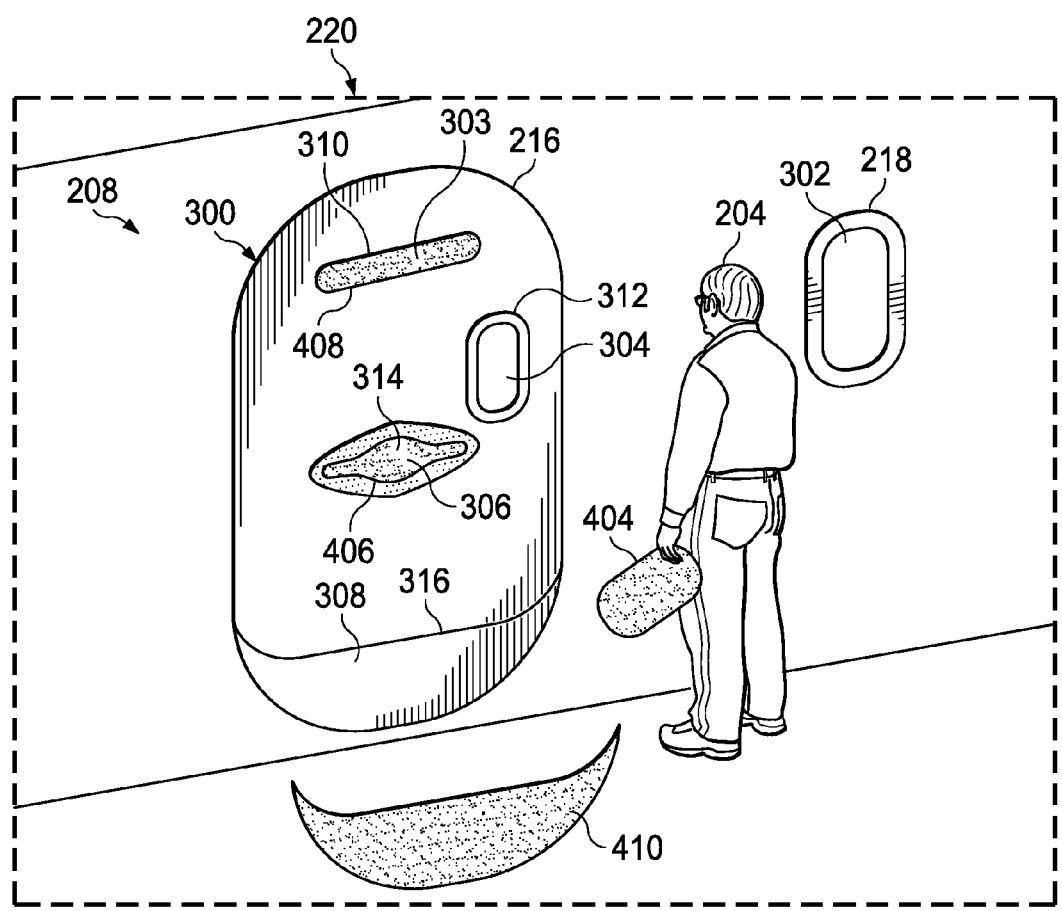
FIG. 11 is an illustration of a section of an aircraft with an operator applying a plurality of masks in accordance with an illustrative embodiment.

Referring now to FIG. 11, an illustration of section 220 of aircraft 206 with operator 204 in FIG. 2 applying plurality of masks 400 from FIG. 4 is depicted in accordance with an illustrative embodiment. In this depicted example, mask 406 has been placed over surface 306 of door handle 314. Mask 408 has been placed over surface 303 of pressure relief vent 310. Mask 404 and mask 410 still need to be placed over surface 304 of viewing window 312 and surface 308 of kick plate 316, respectively.

After plurality of masks 400 are placed on surfaces 300 of door 216 in a desired manner, door 216 may be painted. The use of plurality of masks 400 formed using mask forming system 202 reduces the risk of overspray contacting surfaces 300 during painting of aircraft 206.

The illustrations of mask forming system 202, plurality of masks 400, and the components within mask forming system 202 in FIGS. 2-11 are not meant to imply physical or architectural limitations to the manner in which an illustrative embodiment may be implemented. Other components in addition to or in place of the ones illustrated may be used. Some components may be optional.

The different components shown in FIGS. 2-11 may be illustrative examples of how components shown in block form in FIG. 1 can be implemented as physical structures. Additionally, some of the components in FIGS. 2-11 may be combined with components in FIG. 1, used with components in FIG. 1, or a combination of the two.

As an example, although forming tool 210 is shown in FIG. 9 and FIG. 10 with only one plotting tool and one cutting tool, forming tool 210 may have multiple plotting tools and cutting tools that operate simultaneously to form plurality of masks 400. In still another illustrative example, only one mask may be formed from sheet 222 of masking material 224. In yet another illustrative example, controller 214 may be implemented in forming tool 210.

Figure 12:
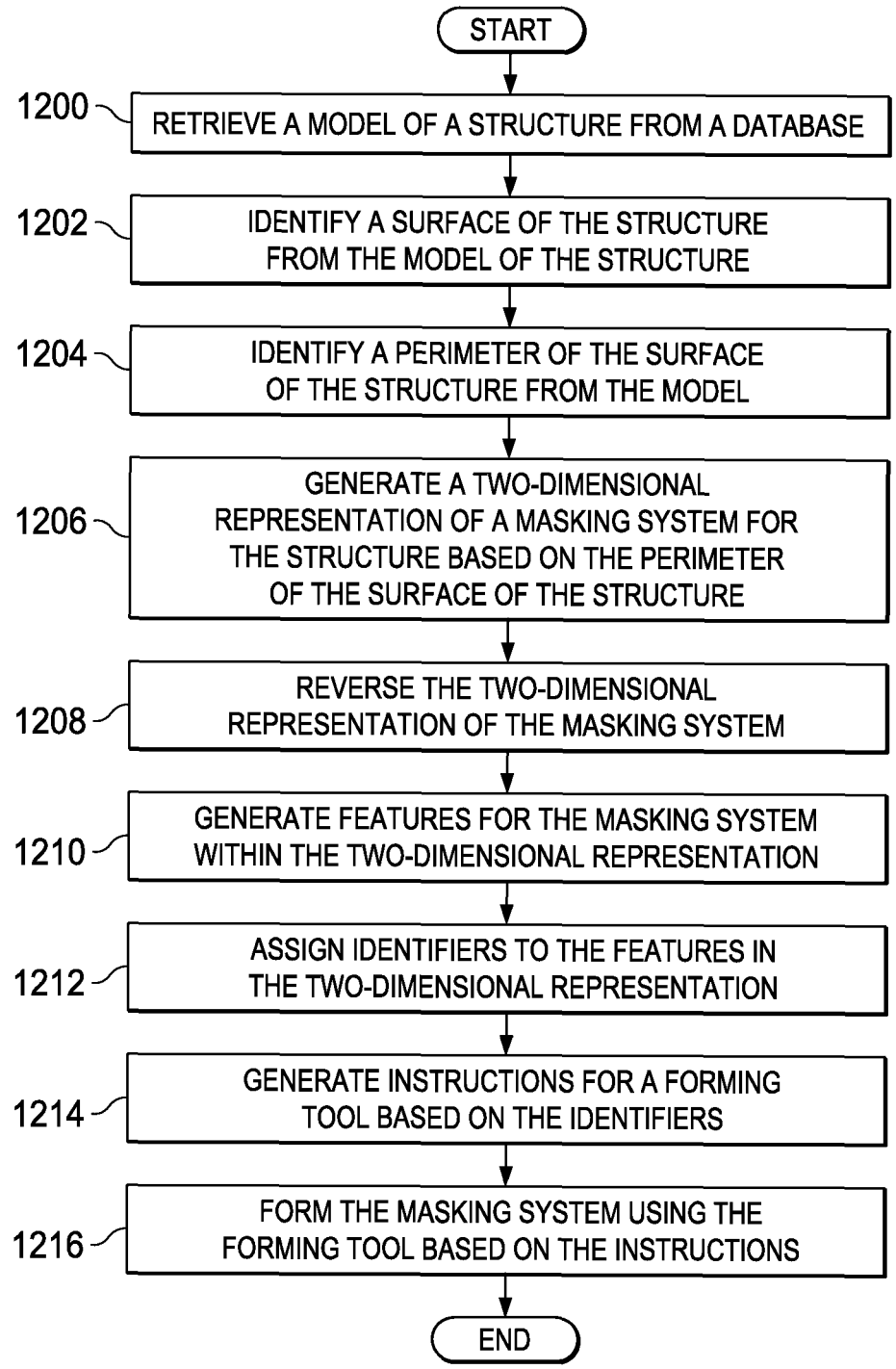
FIG. 12 is an illustration of a flowchart of a process for protecting a structure in accordance with an illustrative embodiment.

With reference now to FIG. 12, an illustration of a flowchart of a process for protecting structure 108 from FIG. 1 is depicted in accordance with an illustrative embodiment. The process illustrated in FIG. 12 may be implemented using components within mask forming system 118 in FIG. 1. In particular, the process illustrated in FIG. 12 may be implemented to form masking system 116 using forming tool 120 with instructions 170 generated by controller 124 in FIG. 1.

The process may begin by retrieving model 156 of structure 108 from database 121 (operation 1200). Next, the process may identify surface 112 of structure 108 from model 156 of structure 108 (operation 1202). Thereafter, the process may identify perimeter 114 of surface 112 of structure 108 from model 156 (operation 1204). Perimeter 114 is identified for surface 112 of structure 108 to be covered by masking system 116 during painting of structure 108.

The process may then generate two-dimensional representation 160 of masking system 116 for structure 108 based on perimeter 114 of surface 112 of structure 108 (operation 1206). Thereafter, the process may reverse two-dimensional representation 160 of masking system 116 (operation 1208).

The process then may generate features 137 for masking system 116 within two-dimensional representation 160 (operation 1210). For example, an outline of features 137 may be drawn in two-dimensional representation 160.

Next, the process may assign identifiers 162 to features 137 in two-dimensional representation 160 (operation 1212). In some illustrative examples, features 137 may be color-coded. In this case, one or more of identifiers 162 may be different colors.

Next, the process may generate instructions 170 for forming tool 120 based on identifiers 162 (operation 1214). The process then may form masking system 116 using forming tool 120 based on instructions 170 (operation 1216), with the process terminating thereafter.

Figure 13:
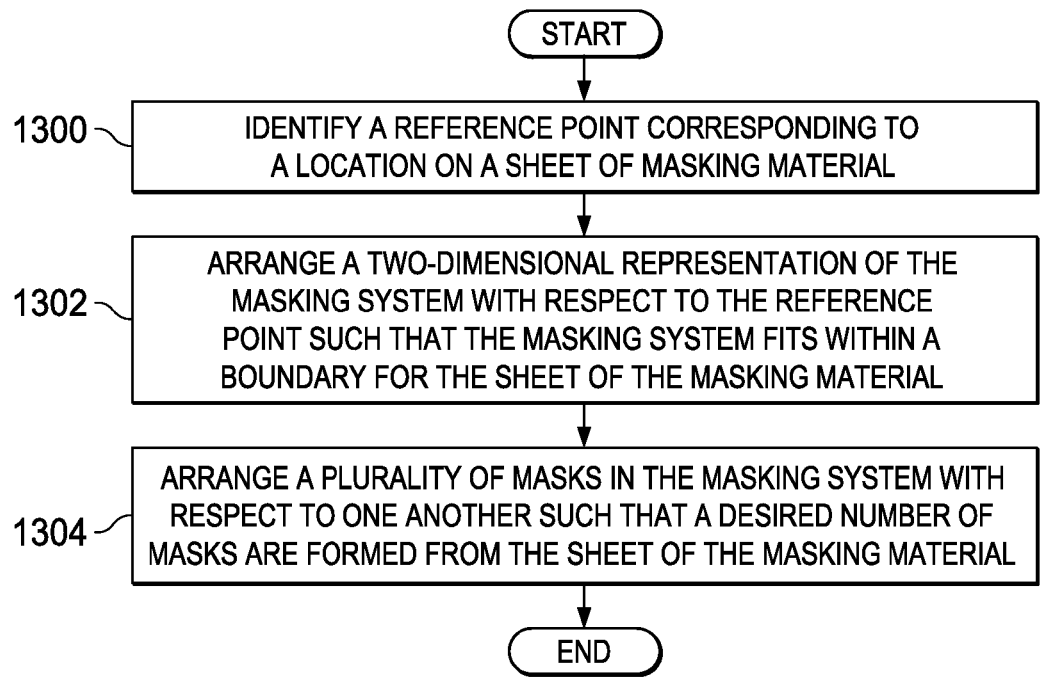
FIG. 13 is an illustration of a flowchart of a process for generating a two-dimensional representation of a masking system for a structure in accordance with an illustrative embodiment.

Turning next to FIG. 13, an illustration of a flowchart of a process for generating two-dimensional representation 160 of masking system 116 for structure 108 from FIG. 1 is depicted in accordance with an illustrative embodiment. The process illustrated in FIG. 13 may be implemented using computer-aided design software 122 in computer system 158 in FIG. 1.

The process may begin by identifying reference point 168 corresponding to location 169 on sheet 126 of masking material 128 (operation 1300). Next, the process may arrange two-dimensional representation 160 of masking system 116 with respect to reference point 168 such that masking system 116 fits within boundary 129 for sheet 126 of masking material 128 (operation 1302). The process then may arrange plurality of masks 119 in masking system 116 with respect to one another such that desired number of masks 166 are formed from sheet 126 of masking material 128 (operation 1304), with the process terminating thereafter.

Figure 14:
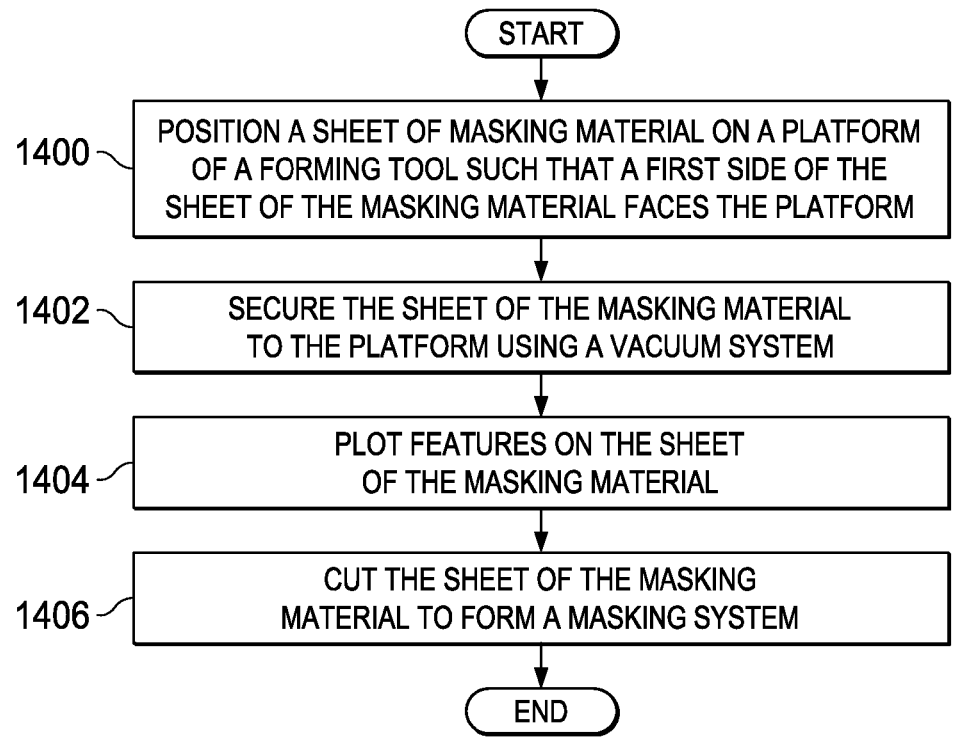
FIG. 14 is an illustration of a flowchart of a process for forming a masking system from a sheet of masking material in accordance with an illustrative embodiment.

Referring now to FIG. 14, an illustration of a flowchart of a process for forming masking system 116 from sheet 126 of masking material 128 from FIG. 1 is depicted in accordance with an illustrative embodiment. The process illustrated in FIG. 14 may be implemented using forming tool 120 to form masking system 116 based on instructions 170 in FIG. 1 during operation 1214 in FIG. 12.

The process may begin by positioning sheet 126 of masking material 128 on platform 144 of forming tool 120 such that first side 130 of sheet 126 of masking material 128 faces platform 144 (operation 1400). Next, the process may secure sheet 126 of masking material 128 to platform 144 using vacuum system 146 (operation 1402). Operation 1402 may occur prior to forming masking system 116.

Thereafter, the process may plot features 137 on sheet 126 of masking material 128 (operation 1404). The process may then cut sheet 126 of masking material 128 to form masking system 116 (operation 1406), with the process terminating thereafter.

Figure 15:
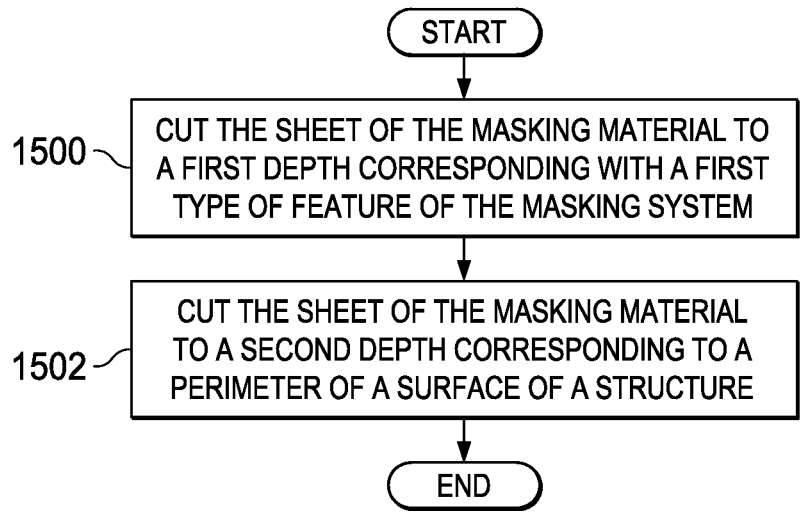
FIG. 15 is an illustration of a flowchart of a process for cutting a sheet of masking material to form a masking system in accordance with an illustrative embodiment.

In FIG. 15, an illustration of a flowchart of a process for cutting sheet 126 of masking material 128 to form masking system 116 from FIG. 1 is depicted in accordance with an illustrative embodiment. The process illustrated in FIG. 15 may be implemented using forming tool 120 to form masking system 116 based on instructions 170 in FIG. 1 during operation 1406 in FIG. 14.

The process may begin by cutting sheet 126 of masking material 128 to first depth 147 corresponding with first type of feature 149 of masking system 116 (operation 1500). The process may then cut sheet 126 of masking material 128 to second depth 151 corresponding to perimeter 114 of surface 112 of structure 108 (operation 1502), with the process terminating thereafter. Optionally, masking system 116 formed by forming tool 210 may be inspected to ensure that the cuts are made in a desired manner.

Figure 16:
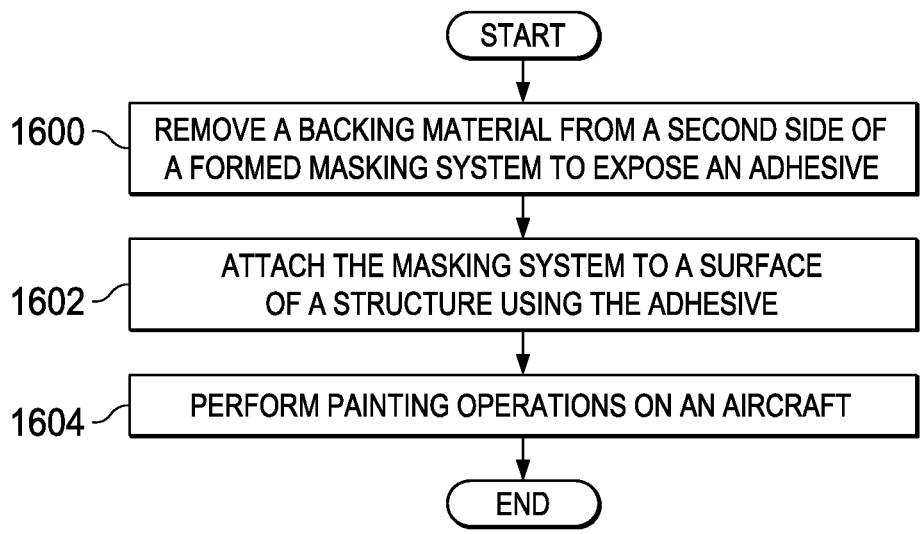
FIG. 16 is an illustration of a flowchart of a process for installing a masking system on a surface of a structure in accordance with an illustrative embodiment.

Turning next to FIG. 16, an illustration of a flowchart of a process for installing masking system 116 on surface 112 of structure 108 in FIG. 1 is depicted in accordance with an illustrative embodiment. The process illustrated in FIG. 16 may be implemented by operator 155 to protect surface 112 of structure 108 during painting of aircraft 104.

The process may begin by removing backing material 134 from second side 132 of the formed masking system 116 to expose adhesive 136 (operation 1600). Next, the process may attach masking system 116 to surface 112 of structure 108 using adhesive 136 (operation 1602). The process may then perform painting operations on aircraft 104 (operation 1604), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1700 as shown in FIG. 17 and aircraft 1800 as shown in FIG. 18. Turning first to FIG. 17, an illustration of a block diagram of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 may go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of a block diagram of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. In particular, masking system 116 may be formed using mask forming system 118 from FIG. 1 during any one of the stages of aircraft manufacturing and service method 1700. For example, without limitation, masking system 116 may be used formed during at least one of component and subassembly manufacturing 1706, system integration 1708, routine maintenance and service 1714, or some other stage of aircraft manufacturing and service method 1700. Masking system 116 may then be attached to surface 112 of structure 108 or other structures 106 in aircraft 104 prior to or during manufacturing, rework, or other operations performed during manufacturing and service method 1700.

In one illustrative example, components or subassemblies produced in component and subassembly manufacturing 1706 in FIG. 17 may be fabricated or manufactured in a manner similar to components or subassemblies produced while aircraft 1800 is in service 1712 in FIG. 17. As yet another example, one or more apparatus embodiments, method embodiments, or a combination thereof may be utilized during production stages, such as component and subassembly manufacturing 1706 and system integration 1708 in FIG. 17. One or more apparatus embodiments, method embodiments, or a combination thereof may be utilized while aircraft 1800 is in service 1712, during maintenance and service 1714 in FIG. 17, or a combination thereof. The use of a number of the different illustrative embodiments may substantially expedite the assembly, reduce the cost of aircraft 1800, or both.

Turning now to FIG. 19, an illustration of a block diagram of a data processing system is depicted in accordance with an illustrative embodiment. Data processing system 1900 may be used to implement one or more computers in computer system 158 in FIG. 1. As depicted, data processing system 1900 includes communications framework 1902, which provides communications between processor unit 1904, storage devices 1906, communications unit 1908, input/output unit 1910, and display 1912. In some cases, communications framework 1902 may be implemented as a bus system.

Processor unit 1904 is configured to execute instructions for software to perform a number of operations. Processor unit 1904 may comprise a number of processors, a multi-processor core, some other type of processor, or some combination thereof, depending on the implementation. In some cases, processor unit 1904 may take the form of a hardware unit, such as a circuit system, an application specific integrated circuit (ASIC), a programmable logic device, or some other suitable type of hardware unit.

Instructions for the operating system, applications, programs, or both run by processor unit 1904 may be located in storage devices 1906. Storage devices 1906 may be in communication with processor unit 1904 through communications framework 1902. As used herein, a storage device, also referred to as a computer readable storage device, is any piece of hardware capable of storing information on a temporary basis, permanent basis, or both. This information may include, but is not limited to, at least one of data, program code, or other information.

Memory 1914 and persistent storage 1916 are examples of storage devices 1906. Memory 1914 may take the form of, for example, a random access memory or some type of volatile or non-volatile storage device. Persistent storage 1916 may comprise any number of components or devices. For example, persistent storage 1916 may comprise a hard drive, a flash memory, a rewritable optical disk, a rewritable magnetic tape, or some combination of the above. The media used by persistent storage 1916 may or may not be removable.

Communications unit 1908 allows data processing system 1900 to communicate with other data processing systems, devices, or some combination thereof. Communications unit 1908 may provide communications using physical communications links, wireless communications links, or a combination thereof.

Input/output unit 1910 allows input to be received from and output to be sent to other devices connected to data processing system 1900. For example, input/output unit 1910 may allow user input to be received through at least one of a keyboard, a mouse, or some other type of input device. As another example, input/output unit 1910 may allow output to be sent to a printer connected to data processing system 1900.

Display 1912 is configured to display information to a user. Display 1912 may comprise, for example, without limitation, selected from one of a monitor, a touch screen, a laser display, a holographic display, a virtual display device, or some other type of display device.

In this illustrative example, the processes of the different illustrative embodiments may be performed by processor unit 1904 using computer-implemented instructions. These instructions may be referred to as program code, computer usable program code, or computer readable program code and may be read and executed by one or more processors in processor unit 1904.

In these examples, program code 1918 is located in a functional form on computer readable media 1920, which is selectively removable, and may be loaded onto or transferred to data processing system 1900 for execution by processor unit 1904. Program code 1918 and computer readable media 1920 together form computer program product 1922. In this illustrative example, computer readable media 1920 may be computer readable storage media 1924 or computer readable signal media 1926.

Computer readable storage media 1924 is a physical or tangible storage device used to store program code 1918 rather than a medium that propagates or transmits program code 1918. Computer readable storage media 1924 may be, for example, without limitation, an optical or magnetic disk or a persistent storage device that is connected to data processing system 1900.

Alternatively, program code 1918 may be transferred to data processing system 1900 using computer readable signal media 1926. Computer readable signal media 1926 may be, for example, a propagated data signal containing program code 1918. This data signal may be an electromagnetic signal, an optical signal, or some other type of signal that can be transmitted over physical, wireless communications links, or some combination thereof.

The illustration of data processing system 1900 in FIG. 19 is not meant to provide architectural limitations to the manner in which the illustrative embodiments may be implemented. The different illustrative embodiments may be implemented in a data processing system that includes components in addition to or in place of those illustrated for data processing system 1800. Further, components shown in FIG. 19 may be varied from the illustrative examples shown.

Thus, the illustrative embodiments may provide a method and apparatus for protecting structure 108. Surface 112 of structure 108 may be identified from model 156 of structure 108 of structure 108. Perimeter 114 of structure 108 may be identified from model 156. Perimeter 114 may be identified for surface 112 of structure 108 to be covered by masking system 116 during painting of structure 108. Two-dimensional representation 160 of masking system 116 may be generated for structure 108 based on perimeter 114 of surface 112 of structure 108. Two-dimensional representation 160 of masking system 116 may be reversed. Features 137 for masking system 116 may be generated within two-dimensional representation 160. Identifiers 162 may be assigned to features 137 in two-dimensional representation 160. Instructions 170 may be generated for forming tool 120 based on identifiers 162. Masking system 116 may be formed using forming tool 120 based on instructions 170. Masking system 116 may be formed from sheet 126 of masking material 128.

With the use of an illustrative embodiment, masking system 116 used for protecting structures 106 in aircraft 104 from undesired contact with paint 103 may be formed more quickly and easily. For example, each mask in masking system 116 may be formed using one of models 152 for structures 106 in aircraft 104. From models 152, masks in masking system 116 may be formed with a desired shape that substantially matches the perimeter of the surface of each of structures 106. Accordingly, substantially all of the surfaces of structures 106 may be protected using masking system 116.

The illustrative embodiments also provide a masking system that may be installed more easily than some currently used systems. For instance, with kiss cut 140 cut into masking system 116, operator 155 may easily bend a mask in masking system 116 and peel off backing material 134 to expose adhesive. Masking system 116 may be attached to a surface of a structure in one step. Masking system 116 also may be removed from the surface of the structure in one step.

Moreover, the use of computer-aided design software 122 to arrange representations 154 of plurality of masks 119 in masking system 116 with respect to one another allows more masks to be formed from a single sheet 126 of masking material 128. When more masks are formed from sheet 126 of masking material 128, waste may be reduced. Additionally, masking system 116 with plurality of masks 119 may be formed at a desired speed.

Forming masking system 116 in this manner substantially reduces the time needed for operator 155 to install masking system 116. As a result, manufacturing time for aircraft 104 may be reduced and cost savings may occur.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for protecting a structure, the method comprising:
   identifying a surface of the structure from a model of the structure;
   identifying a perimeter of the surface of the structure from the model, in which the perimeter is identified for the surface of the structure to be covered by a masking system during painting of the structure;
   generating a two-dimensional representation of the masking system for the structure based on the perimeter of the surface of the structure;
   generating features for the masking system within the two-dimensional representation wherein the masking system comprises a plurality of masks;
   assigning identifiers to the features in the two-dimensional representation, wherein the identifiers are color coded so that die cuts are coded with a first color, kiss cuts are coded with a second color, and texts are coded with a third color;
   generating instructions for a forming tool based on the identifiers;
   forming the masking system from a sheet of masking material using the forming tool based on the instructions;
   identifying a reference point corresponding to a location on the sheet of masking material;
   arranging the two-dimensional representation of the masking system with respect to the reference point such that the masking system fits within a boundary for the sheet of masking material; and
   arranging the plurality of masks with respect to one another such that a desired number of masks are formed from the sheet of masking material.

2. The method of claim 1, wherein the masking system includes one of a single mask and a plurality of masks.

3. The method of claim 1 further comprising:
   retrieving the model of the structure from a database.

4. The method of claim 1, wherein forming the masking system comprises:
   plotting the features on the sheet of masking material; and
   cutting the sheet of masking material to form the masking system.

5. The method of claim 4, wherein cutting the sheet of masking material comprises:
   cutting the sheet of masking material to a first depth corresponding with a first type of feature of the masking system;
   cutting the sheet of masking material to a second depth corresponding to the perimeter of the surface of the structure;
   cutting the sheet of masking material to a third depth corresponding to a second type of feature of the masking system; and
   wherein the first depth is for a kiss cut, the second depth is for a die cut, and the third depth is for a kiss cut.

6. The method of claim 1, wherein the sheet of masking material comprises a first side and a second side having a backing material covering the second side, and further comprising:
   positioning the sheet of masking material on a platform of the forming tool such that the first side of the sheet of masking material faces the platform; and
   securing the sheet of masking material to the platform using a vacuum system prior to forming the masking system.

7. The method of claim 6, wherein the second side of the sheet of masking material comprises an adhesive and further comprising:
  removing the backing material from the second side of the formed masking system to expose the adhesive; and
  attaching the masking system to the surface of the structure using the adhesive.

8. The method of claim 1, wherein the features include a kiss cut and a die cut.

9. The method of claim 1 further comprising:
  reversing the two-dimensional representation of the masking system.

10. A mask forming system comprising:
  a forming tool configured to form a masking system used to protect a structure during painting, in which the masking system is formed on a sheet of masking material, wherein the masking system comprises a plurality of masks;
  computer-aided design software configured to retrieve a model of the structure from a database; identify a surface of the structure from the model of the structure; identify a perimeter of the surface of the structure from the model, in which the perimeter is identified for a surface of the structure to be covered by the masking system during painting of the structure; generate a two-dimensional representation of the masking system for the structure based on the perimeter of the surface of the structure; reverse the two-dimensional representation; generate features for the masking system within the two-dimensional representation; assign identifiers to the features in the two-dimensional representation, wherein the identifiers are color coded so that die cuts are coded with a first color, kiss cuts are coded with a second color, and texts are coded with a third color; arrange the plurality of masks with respect to one another such that a desired number of masks are formed from the sheet of masking material; identify a reference point corresponding to a location on the sheet of masking material; and arrange the two-dimensional representation of the masking system with respect to the reference point such that the masking system fits within a boundary for the sheet of masking material; and
  a controller configured to generate instructions for the forming tool based on the identifiers.

11. The mask forming system of claim 10, wherein the sheet of masking material comprises:
  a first side; and
  a second side opposite the first side and having an adhesive, wherein a backing material covers the second side.

12. The mask forming system of claim 11, wherein the forming tool comprises:
  a platform configured to hold the sheet of masking material such that the first side of the sheet of masking material faces the platform;
  a vacuum system associated with the platform and configured to secure the sheet of masking material to the platform prior to forming the masking system;
  a plotting tool configured to plot the features on the sheet of masking material; and
  a cutting tool configured to cut the sheet of masking material to form the masking system.

13. The mask forming system of claim 12, wherein the cutting tool is configured to cut the sheet of masking material to a first depth corresponding with a first type of feature of the masking system and a second depth corresponding to the perimeter of the surface of the structure.

14. The mask forming system of claim 11, wherein the backing material is configured to be removed from the second side of the masking system to expose the adhesive such that the masking system can be attached to the structure using the adhesive.

15. The mask forming system of claim 10, wherein the features include a kiss cut and a die cut.

16. The mask forming system of claim 10, wherein the computer-aided design software is configured to arrange the plurality of masks with respect to one another such that a desired number of masks are formed from the sheet of masking material.

17. A method for protecting a structure, the method comprising:
  retrieving a model of the structure from a database;
  identifying a surface of the structure from the model of the structure;
  identifying a perimeter of the surface of the structure from the model, in which the perimeter is identified for the surface of the structure to be covered by a masking system during painting of the structure, and in which the masking system includes a plurality of masks;
  generating a two-dimensional representation of the masking system for the structure based on the perimeter of the surface of the structure;
  identifying a reference point corresponding to a location on a sheet of masking material; arranging the two-dimensional representation of the masking system with respect to the reference point such that the masking system fits within a boundary for the sheet of masking material; arranging the plurality of masks with respect to one another such that a desired number of masks are formed from the sheet of masking material;
  reversing the two-dimensional representation of the masking system;
  generating features for the masking system within the two-dimensional representation, in which the features include a kiss cut and a die cut;
  assigning identifiers to the features in the two-dimensional representation, in which assigning the identifiers comprises color-coding the features;
  generating instructions for a forming tool based on the identifiers;
  forming the masking system using the forming tool based on the instructions, in which the masking system is formed from the sheet of masking material comprising a first side and a second side, in which a backing material covers the second side, and in which forming the masking system comprises:
    positioning the sheet of masking material on a platform of the forming tool such that the first side of the sheet of masking material faces the platform;
    securing the sheet of masking material to the platform using a vacuum system prior to forming the masking system;
    plotting the features on the sheet of masking material; and
    cutting the sheet of masking material to form the masking system, in which cutting the sheet of masking material comprises cutting the sheet of masking material to a first depth corresponding with a first type of feature of the masking system, and cutting the sheet of masking material to a second depth corresponding to the perimeter of the surface of the structure;
  removing the backing material from the second side of the formed masking system to expose an adhesive; and attaching the masking system to the surface of the structure using the adhesive.

18. A mask forming system comprising:

a forming tool configured to form a masking system used to protect a structure during painting, in which the masking system comprises a plurality of masks formed on a sheet of masking material, in which the sheet of masking material comprises a first side, a second side opposite the first side and having an adhesive and a backing material on the second side, in which the backing material is configured to be removed from the second side of the masking system to expose the adhesive such that the masking system can be attached to the structure using the adhesive, and in which the forming tool comprises:

a platform configured to hold the sheet of masking material such that the first side of the sheet of masking material faces the platform;

a vacuum system associated with the platform and configured to secure the sheet of masking material to the platform prior to forming the masking system;

a plotting tool configured to plot features on the sheet of masking material; and a cutting tool configured to cut the sheet of masking material to form the masking system, in which the cutting tool is configured to cut the sheet of masking material to a first depth corresponding with a first type of feature of the masking system and a second depth corresponding to a perimeter of a surface of the structure;

computer-aided design software configured to retrieve a model of the structure from a database; identify the surface of the structure from the model of the structure; identify the perimeter of the surface of the structure from the model, in which the perimeter is identified for the surface of the structure to be covered by a masking system during painting of the structure; generate a two-dimensional representation of the masking system based on the perimeter of the surface of the structure; reverse the two-dimensional representation; generate features for the masking system within the two-dimensional representation, in which the features include a kiss cut and a die cut; assign identifiers to the features, wherein the identifiers are color coded so that die cuts are coded with a first color, kiss cuts are coded with a second color, and texts are coded with a third color; and arrange the plurality of masks with respect to one another such that a desired number of masks are formed from the sheet of masking material; identify a reference point corresponding to a location on the sheet of masking material; and arrange the two-dimensional representation of the masking system with respect to the reference point such that the masking system fits within a boundary for the sheet of masking material; and a controller configured to generate instructions for the forming tool generate instructions for the forming tool based on the identifiers.

* * * * *

UNITED STATES PATENT AND TRADEMARK OFFICE
CERTIFICATE OF CORRECTION

PATENT NO.         : 9,782,788 B2
APPLICATION NO.    : 14/243114
DATED              : October 10, 2017
INVENTOR(S)        : Andrew E. Sais Page 1 of 1

It is certified that error appears in the above-identified patent and that said Letters Patent is hereby corrected as shown below:

In the Claims

Column 23, Line 24, change "a" to --the--
Column 26, Lines 27-28, delete "generate instructions for the forming tool"

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*